(12) United States Patent
Yamamura et al.

(10) Patent No.: US 7,340,822 B2
(45) Date of Patent: Mar. 11, 2008

(54) INSULATOR AND MANUFACTURING METHOD THEREOF, AND STATOR FOR ELECTRIC ROTATING MACHINE

(75) Inventors: Masashi Yamamura, Shizuoka-ken (JP); Masahiro Gotou, Shizuoka-ken (JP); Noriyuki Suzuki, Shizuoka-ken (JP); Kazushi Sugishima, Shizuoka-ken (JP); Akihiro Suzuki, Shizuoka-ken (JP); Kazunobu Kanno, Aichi-ken (JP); Yoshiyuki Matsushita, Aichi-ken (JP); Toshiaki Yamada, Shizuoka-ken (JP)

(73) Assignee: Asmo Co., Ltd. (JP)

( * ) Notice: Subject to any disclaimer, the term of this patent is extended or adjusted under 35 U.S.C. 154(b) by 274 days.

(21) Appl. No.: 11/157,240

(22) Filed: Jun. 21, 2005

(65) Prior Publication Data

US 2005/0229383 A1    Oct. 20, 2005

Related U.S. Application Data

(62) Division of application No. 10/836,584, filed on Apr. 30, 2004, now Pat. No. 6,946,769.

(30) Foreign Application Priority Data

| May 8, 2003 | (JP) | ............................. 2003-130511 |
| Jun. 16, 2003 | (JP) | ............................. 2003-170519 |
| Dec. 10, 2003 | (JP) | ............................. 2003-412207 |

(51) Int. Cl.
*H02K 15/02* (2006.01)
*H02K 15/10* (2006.01)

(52) U.S. Cl. ............................. 29/598; 29/596; 29/597; 29/603.07; 29/606; 29/609; 29/732; 29/734; 310/71; 310/194; 310/49 R; 310/216; 310/254; 310/217; 310/218

(58) Field of Classification Search ............... 29/596, 29/597, 598, 603.07, 606, 609, 732, 734; 310/71, 194, 49 R, 216–218, 254, 258–259; 264/250, 272.2, 238, 272.11
See application file for complete search history.

(56) References Cited

U.S. PATENT DOCUMENTS 3,609,427 A    9/1971   Lautner et al.

(Continued)

FOREIGN PATENT DOCUMENTS

GB    2 362 268 A    11/2001

(Continued)

OTHER PUBLICATIONS

English language computer translation of JP 11-089128 A.*

(Continued)

*Primary Examiner*—Peter Vo
*Assistant Examiner*—Michael T Hess
(74) *Attorney, Agent, or Firm*—Caesar, Rivise, Bernstein, Cohen & Pokotilow, Ltd.

(57) ABSTRACT

A stator for a motor includes a stator core, an insulator, and coils. The stator core includes an annular portion and teeth, which extend radially from the annular portion. The stator core is divided into core segments in the circumferential direction. Each core segment has an arcuate portion and one of the teeth, which extends from the arcuate portion. The insulator insulates each coil wound around one of the teeth from the stator core. The insulator includes coupling portions at positions corresponding to the circumferential ends of the arcuate portions. Each coupling portion couples the adjacent core segments to be rotatable relative to each other. The insulator facilitates manufacture of the stator.

4 Claims, 19 Drawing Sheets

U.S. PATENT DOCUMENTS

| | | | | |
|---|---|---|---|---|
| 6,127,753 | A | * | 10/2000 | Yamazaki et al. .......... 310/71 |
| 2003/0020359 | A1 | | 1/2003 | Matsumoto et al. |
| 2003/0222531 | A1 | | 12/2003 | Akutsu et al. |
| 2004/0051417 | A1 | | 3/2004 | Yamazaki et al. |

FOREIGN PATENT DOCUMENTS

| JP | 61180563 | 8/1986 |
|---|---|---|
| JP | 07-222383 | 8/1995 |
| JP | 10-155248 | 6/1998 |
| JP | 11089128 | 3/1999 |
| JP | 11318050 | 11/1999 |
| JP | 2000139052 | 5/2000 |
| JP | 2002-247788 | 8/2002 |

OTHER PUBLICATIONS

Preliminary Search Report from Institute National de La Propriete Industrielle dated Sep. 15, 2005.

* cited by examiner

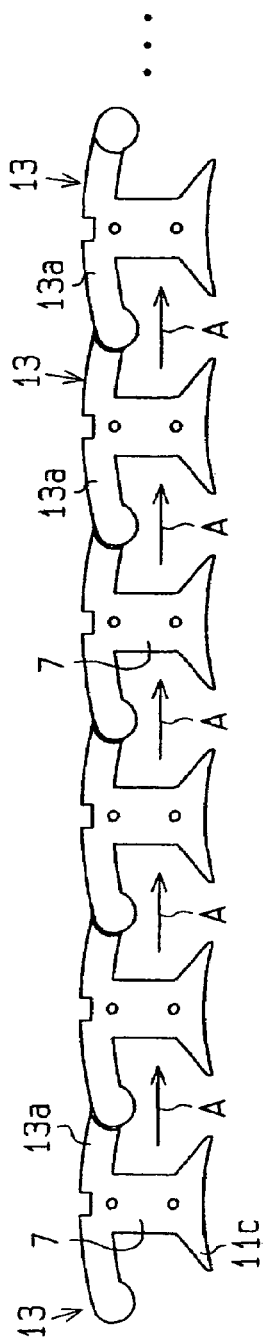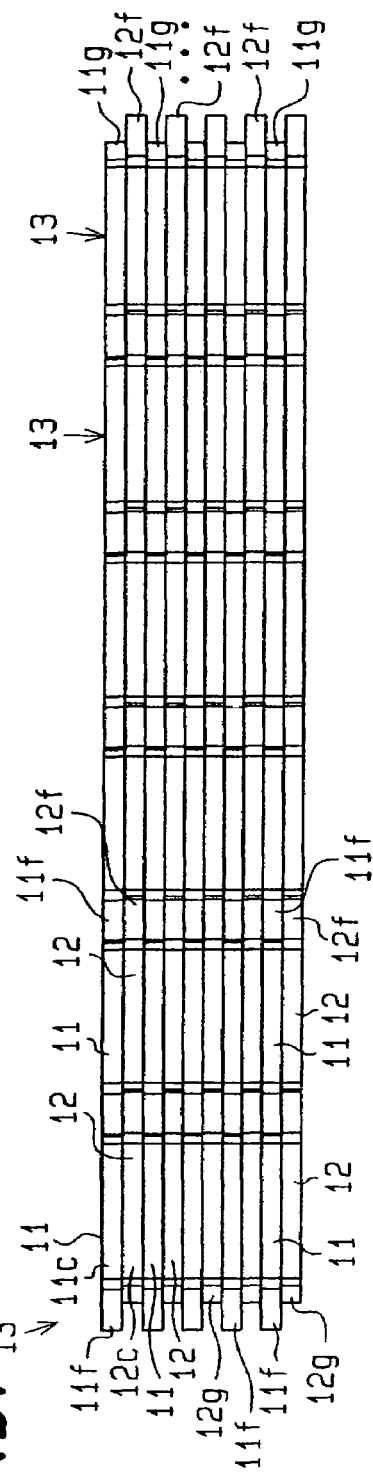

INSULATOR AND MANUFACTURING METHOD THEREOF, AND STATOR FOR ELECTRIC ROTATING MACHINE

BACKGROUND OF THE INVENTION

The present invention relates to an insulator for insulating the core of an electric rotating machine from coils wound around the core and a method for manufacturing the insulator. The present invention also pertains to a stator for an electric rotating machine.

A typical stator of an electric rotating machine such as a brushless motor, includes a core, which has teeth, and coils each wound around one of the teeth. The core has an annular portion and the teeth extend from the annular portion radially toward the center of the annular portion. Each coil is wound around one of the teeth with an insulator arranged in between.

As an example of such a core, a core that is formed by coupling several core segments in annular form has been proposed. Each core segment includes a tooth and is formed by laminating thin plate-like piece members. A coil is wound around the tooth of each core segment before coupling the core segments with one another. Therefore, a coil is easily wound around a tooth without interfering with the adjacent teeth.

In a stator disclosed in Japanese Laid-Open Patent Publication No. 7-222383, each core segment is formed by alternately laminating first piece members and second piece members. Each core segment has an arcuate portion, which forms part of the annular portion of the core. At the circumferential ends of the arcuate portion of each core segment, the ends of each first piece member and the ends of each second piece member are displaced in the circumferential direction. Therefore, the circumferential ends of the arcuate portion of each core segment have a shape in which recesses and projections are alternately arranged. Each of the circumferential ends of each core segment is coupled to the corresponding circumferential end of the adjacent core segment with a pin so that the annular core is obtained when all the core segments are coupled to one another. In a state where the projections of one of the adjacent core segments are fitted to the recesses of the other core segment, that is, in a state where the projections of the adjacent core segments overlap one another in the axial direction, a pin is inserted through the overlapped projections. In such a core, the adjacent core segments are reliably coupled to each other without forming a space in between. This reduces magnetic resistance at the annular portion and forms a reliable magnetic circuit. Also, since the projections overlap one another in the axial direction, the coupled core segments are prevented from being displaced in the axial direction.

When manufacturing the stator, a coil is wound around each separate core segment before coupling the core segments with one another with the pins. After winding each coil to the corresponding core segment, the core segments are coupled to one another with the pins. This makes the manufacturing process for the stator difficult and complicates handling of the core segments. The pins used for coupling the core segments increase the number of components.

Japanese Laid-Open Patent Publication No. 2002-247788 discloses an insulator attached to each of the core segments. The insulator corresponds to one core segment and is separate from an insulator attached to another core segment. Before winding a coil about each core segment, the insulator is attached to each core segment. This makes the manufacturing process for the stator difficult and increases the manufacturing time and the manufacturing cost.

SUMMARY OF THE INVENTION

Accordingly, it is an objective of the present invention to provide an insulator that facilitates manufacture of a stator for an electric rotating machine.

Another objective of the present invention is to provide a method for manufacturing the insulator easily.

A further objective of the present invention is to provide a stator for an electric rotating machine that is easily manufactured.

To achieve the foregoing and other objectives and in accordance with the purpose of the present invention, an insulator for attachment to a core having an annular portion and a plurality of teeth is provided. The teeth extend radially from the annular portion. The core is divided into a plurality of core segments in the circumferential direction. Adjacent core segments are permitted to rotate relative to each other. The insulator is for insulating a coil wound around each tooth from the core. The insulator includes a plurality of coupling portions. Each coupling portion couples the adjacent core segments so as to be rotatable relative to each other.

The present invention also provides a stator for an electric rotating machine. The stator has a plurality of core segments, an insulator, and a plurality of coils. Each core segment is formed by alternately laminating first piece members and second piece members. Each core segment has an arcuate portion and a tooth extending from the arcuate portion in a direction substantially orthogonal to the arcuate portion. Each arcuate portion includes opposite circumferential ends. When the core segments are arranged in an annular form, the arcuate portions form the annular portion and the teeth are arranged radially. The insulator is attached to the plurality of core segments. Each coil is wound around one of the teeth via the insulator. Each of the first and second piece members has a first end corresponding to one of the circumferential ends of the arcuate portion and a second end corresponding to the other one of the circumferential ends of the arcuate portion. The first piece member has an arcuate projection on the first end of the first piece member and an arcuate recess on the second end of the first piece member. The second piece member has an arcuate recess on the first end of the second piece member and an arcuate projection on the second end of the second piece member. When each piece member is viewed from the axial direction, the arcuate projection forms an arcuate projection shape and the arcuate recess forms an arcuate recess shape. When the plurality of core segments are arranged in an annular form, the arcuate projections overlap one another at the adjacent circumferential ends of the arcuate portions. The insulator has a plurality of coupling portions at positions corresponding to the circumferential ends of the arcuate portions. Each coupling portion couples the adjacent core segments so as to be rotatable relative to each other.

Further, the present invention provides a method for manufacturing an insulator attached to a core. The core is divided into a plurality of core segments in the circumferential direction, and the insulator insulates a coil wound around each of the core segments from the core. The method includes: molding a plurality of first and second insulating members each having circumferential ends, which are arranged alternately to form the insulator, wherein each insulating member corresponds to one of the core segments, wherein a coupling opening is formed on either circumferential end of each first insulating member, wherein a coupling projection is formed on either circumferential end of each second insulating member, and wherein the first and second insulating members are molded such that each coupling opening of each first insulating member is axially displaced from the corresponding one of the coupling projections of one of adjacent second insulating members; and coupling the adjacent first and second insulating members by axially moving at least either the first or second insulating members relative to the other one of the first and second insulating members thereby inserting each coupling projection into the corresponding coupling opening.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4(a) is a plan view illustrating a state where part of a stator core of the motor shown in FIG. 1 is shown partially disassembled and enlarged;

FIG. 4(b) is a front view illustrating the stator core shown in FIG. 4(a);

FIG. 4(c) is a perspective view illustrating the stator core shown in FIG. 4(a);

DETAILED DESCRIPTION OF THE PREFERRED EMBODIMENTS

Figure 1:
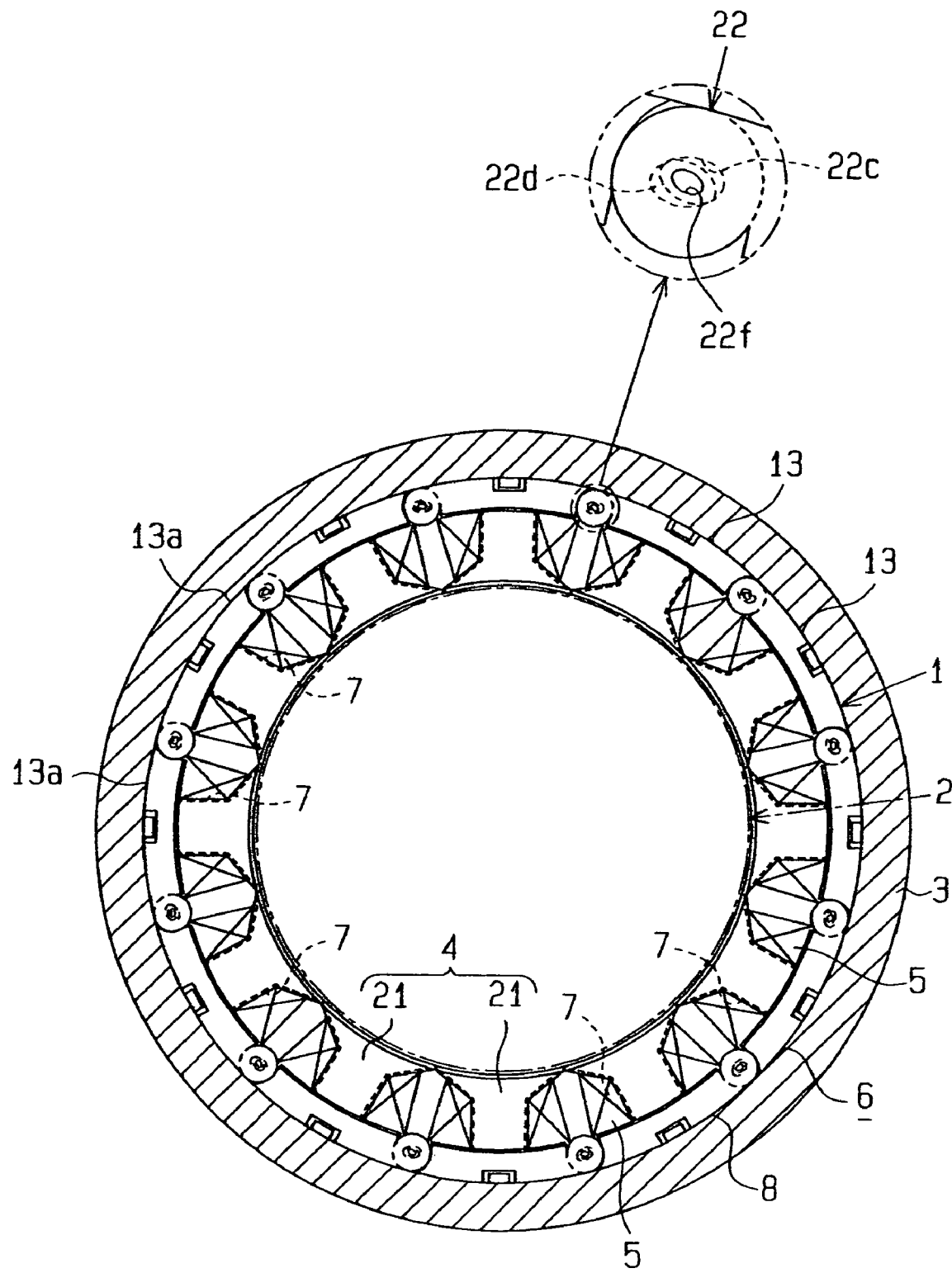
FIG. 1 is a partial cross-sectional view illustrating a brushless motor according to a first embodiment of the present invention.

A first embodiment of the present invention will now be described with reference to FIGS. 1 to 12. As shown in FIG. 1, an electric rotating machine, which is a brushless motor in this embodiment, includes a stator 1 and a rotor 2 (indicated with a dashed line in FIG. 1). The rotor 2 has magnets (not shown) located opposite to the stator 1. The stator 1 is located in a substantially cylindrical housing 3 and surrounds the rotor 2. The stator 1 includes a stator core 6, an insulator 4, and coils 5.

The stator core 6 includes an annular portion 8 and teeth 7, which extend from the annular portion 8 radially toward the axis of the annular portion 8. Each coil 5 is wound around one of the teeth 7. In the first embodiment, twelve teeth 7 are arranged at equal angular intervals of 30 degrees.

As shown in FIGS. 4(b) and 4(c), the stator core 6 is formed by core segments (divided core members) 13 arranged in an annular form. Each core segment 13 is formed by alternately laminating first piece members 11 (see FIGS. 2(a) and 2(b)) and second piece members 12 (see FIGS. 3(a) and 3(b)).

Figure 2A:
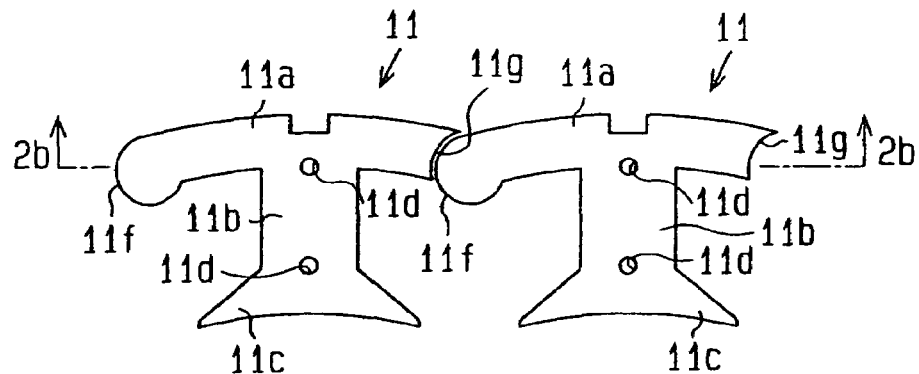
FIG. 2(a) is a plan view illustrating first piece members, which are components of core segments of the motor shown in FIG. 1.
Figure 2B:
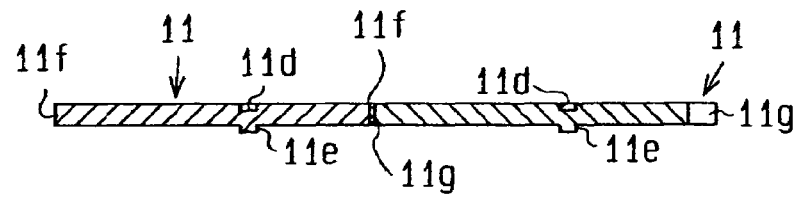
FIG. 2(b) is a cross-sectional view taken along line 2b-2b in FIG. 2(a)

As shown in FIGS. 2(a) and 2(b), each first piece member 11 has an arcuate plate (divided annular portion) 11a and a tooth plate 11b, which extends from the circumferential middle portion of the arcuate plate 11a. Each tooth plate 11b extends in a direction substantially orthogonal to the corresponding arcuate plate 11a. In other words, the tooth plate 11b extends toward the axis of the arcuate plate 11a. A projection 11c is formed at the distal end of each tooth plate 11b and extends in the circumferential direction. Two first recesses 11d are formed on one of the surfaces of the tooth plate 11b facing opposite directions in the thickness direction (axial direction), and two first projections 11e are formed on the other one of the surfaces. Each first recess 11d and the corresponding first projection 11e are formed at the identical positions on different surfaces of the tooth plate 11b. Two pairs of the first recess 11d and the first projection 11e are arranged next to each other in the longitudinal direction of each tooth plate 11b.

As shown in FIG. 2(a), an arcuate projection 11f is formed at a first end (left end) of each arcuate plate 11a. The arcuate projection 11f has an arcuate projection shape when the arcuate plate 11a is viewed from the axial direction. An arcuate recess 11g is formed at a second end (right end) of each arcuate plate 11a. The arcuate recess 11g has an arcuate recess shape when the arcuate plate 11a is viewed from the axial direction. That is, the arcuate projections 11f and the arcuate recesses 11g are formed such that when two first piece members 11 are arranged next to each other with the arcuate projection 11f of one of the first piece members 11 abutting against the arcuate recess 11g of the other first piece member 11 as shown in FIG. 2(a), the first piece members 11 are permitted to rotate relative to each other.

Figure 3A:
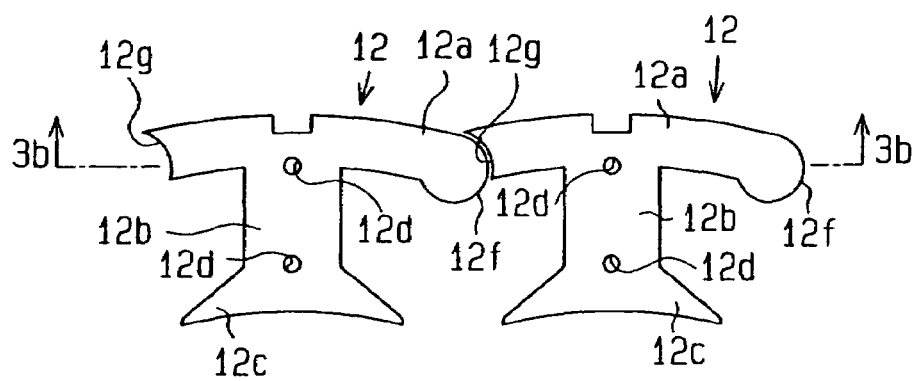
FIG. 3(a) is a plan view illustrating second piece members, which are components of core segments of the motor shown in FIG. 1.
Figure 3B:
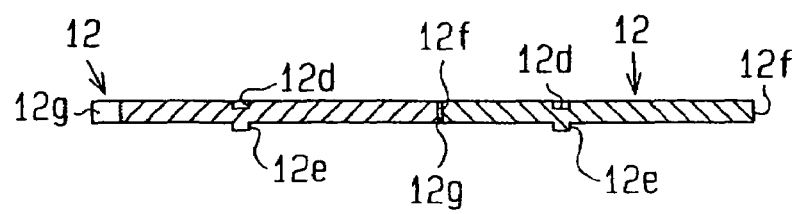
FIG. 3(b) is a cross-sectional view taken along line 3b-3b in FIG. 3(a)

As shown in FIGS. 3(a) and 3(b), the second piece members 12 have a shape symmetric to the first piece members 11. That is, each second piece member 12 has an arcuate plate 12a and a tooth plate 12b, which extends from the circumferential middle portion of the arcuate plate 12a toward the axis. A projection 12c is formed at the distal end of each tooth plate 12b and extends in the circumferential direction. Two second recesses 12d are formed on one of the surfaces of the tooth plate 12b facing opposite directions in the thickness direction (axial direction), and two second projections 12e are formed on the other one of the surfaces. Each second recess 12d and the corresponding second projection 12e are formed at the identical position on different surfaces of the tooth plate 12b. Two pairs of the second recess 12d and the second projection 12e are arranged next to each other in the longitudinal direction of the tooth plate 12b.

As shown in FIG. 3(a), an arcuate projection 12f is formed at a second end (right end) of each arcuate plate 12a. The arcuate projection 12f has an arcuate projection shape when the arcuate plate 12a is viewed from the axial direction. An arcuate recess 12g is formed at a first end (left end) of each arcuate plate 12a. The arcuate recess 12g has an arcuate recess shape when the arcuate plate 12a is viewed from the axial direction. That is, the arcuate projections 12f and the arcuate recesses 12g are formed such that when two second piece members 12 are arranged next to each other with the arcuate projection 12f of one of the second piece members 12 abutting against the arcuate recess 12g of the other second piece member 11 as shown in FIG. 3(a), the second piece members 12 are permitted to rotate relative to each other.

As shown in FIGS. 4(a) to 4(c), five first piece members 11 and five second piece members 12 are alternately laminated to form a core segment 13. The core segment 13 includes an arcuate portion (divided annular portion) 13a, which is formed by alternately laminated arcuate plates 11a, 12a, and the tooth 7, which is formed by alternately laminated tooth plates 11b, 12b. The first and second piece members 11, 12 are secured to one another by press-fitting the first projections 11e in the second recesses 12d and press-fitting the second projections 12e in the first recesses 11d. At the first end of the arcuate portion 13a of the core segment 13, the arcuate projections 11f and the arcuate recesses 12g are arranged alternately. At the second end of the arcuate portion 13a of the core segment 13, the arcuate projections 12f and the arcuate recesses 11g are arranged alternately (see FIG. 4(b)). When several core segments 13 are arranged next to one another in an annular form, the annular portion 8, which includes arcuate portions 13a, is formed and the teeth 7 are arranged radially (see FIG. 1). In this state, the recesses and projections on each circumferential end of the arcuate portion 13a of each core segment fit with the recesses and projections on the corresponding circumferential end of the arcuate portion 13a of the adjacent core segment 13. That is, the arcuate projections 11f, 12f overlap one another in the axial direction.

Figure 5:
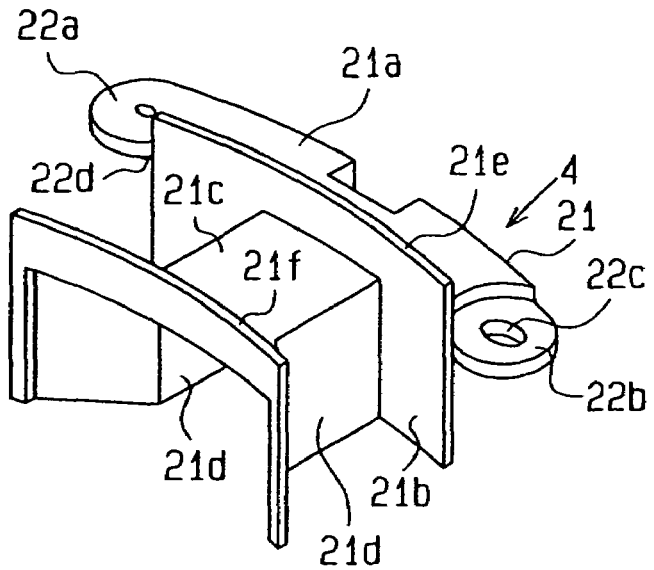
FIG. 5 is a perspective view illustrating an insulating member of the motor shown in FIG. 1.
Figure 6:
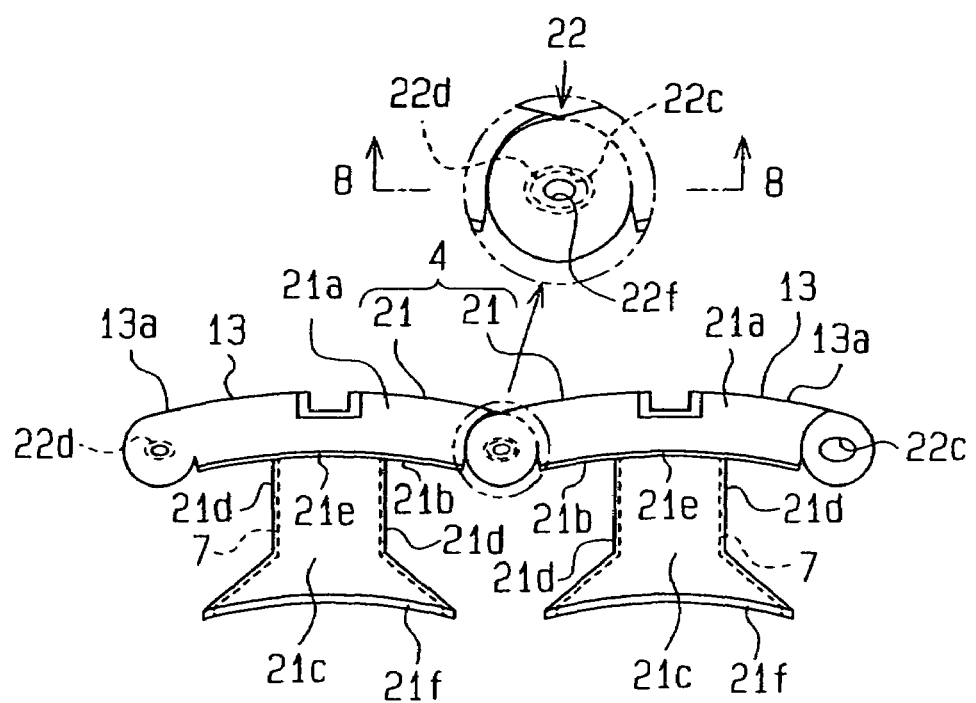
FIG. 6 is a plan view illustrating a state where the insulating member shown in FIG. 5 is attached to the core segment.

The insulator 4 includes insulating members 21 as shown in FIGS. 5 and 6. Each insulating member 21 corresponds to one of the core segments 13. The insulating members 21 are formed of insulative and flexible resin material. Each insulating member 21 includes an arcuate cover 21a, an inner circumferential cover 21b, a flat cover 21c, and a pair of side covers 21d. The arcuate cover 21a covers one of the surfaces of the corresponding arcuate portion 13a that faces different directions from each other in the axial direction. The inner circumferential cover 21b covers the inner circumferential surface of the corresponding arcuate portion 13a. The flat cover 21c covers the surface of the corresponding tooth 7, which is connected to the surface of the arcuate portion 13a covered by the arcuate cover 21a. The side covers 21d cover the side surfaces of the corresponding tooth 7. The inner circumferential cover 21b has an outer restricting wall 21e for preventing the coil 5 wound around the corresponding tooth 7 from protruding radially outward. The flat cover 21c has an inside restricting wall 21f at the end that corresponds to the distal end of the corresponding tooth 7 (lower end as viewed in FIG. 6). The inside restricting wall 21f prevents the coil 5 wound around the corresponding tooth 7 from protruding radially inward.

Figure 7:
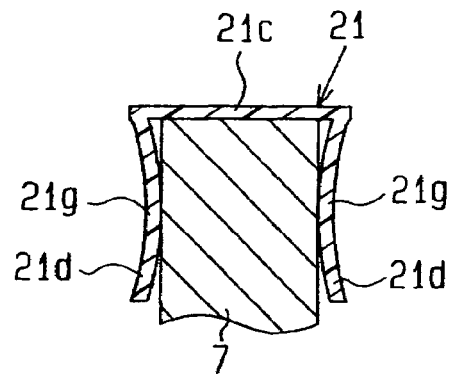
FIG. 7 is a cross-sectional view illustrating holding portions of the insulating member shown in FIG. 5.
Figure 8:
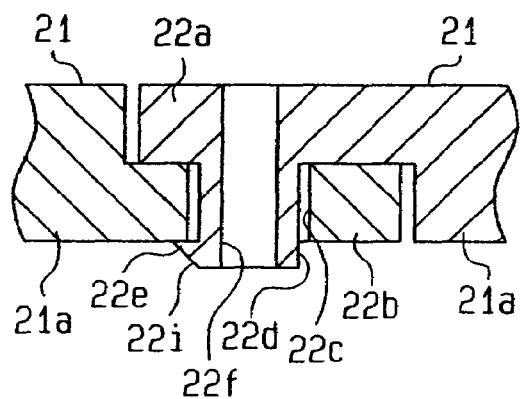
FIG. 8 is a cross-sectional view taken along line 8-8 in FIG. 6.

The side covers 21d extend from the flat cover 21c and are substantially perpendicular to the flat cover 21c. Each side cover 21d has a holding portion 21g as shown in FIG. 7. When each insulating member 21 is not attached to the corresponding tooth 7, the distance between the side covers 21d at the holding portions 21g is narrower than the distance between the side surfaces of the tooth 7. Therefore, when each insulating member 21 is attached to the corresponding tooth 7, the tooth 7 is held by the side covers 21d as shown in FIG. 7. In the first embodiment, the holding portions 21g are formed by flexing the entire side covers 21d inward. The distance between the distal ends (lower end as viewed in FIG. 7) of the side covers 21d is slightly greater than the distance between the side surfaces of the corresponding tooth 7. Therefore, each insulating member 21 is easily attached to the corresponding tooth 7. In FIG. 7, the degree of curvature is exaggerated to facilitate understanding the shape of the holding portions 21g.

Coupling portions 22 (see FIG. 6) are formed at portions of the insulator 4 that correspond to the circumferential ends of each arcuate portion 13a, that is, at the circumferential ends of each arcuate cover 21a. Each coupling portion 22 rotatably couples the adjacent core segments 13 with each other.

More specifically, a substantially circular upper coupling portion 22a is formed at a first circumferential end (left end as viewed in FIG. 6) of each arcuate cover 21a. As shown in FIG. 5, the upper coupling portion 22a is formed by removing the lower half of the thickness of the first circumferential end of each arcuate cover 21a in a substantially circular shape. A substantially circular lower coupling portion 22b is formed at a second circumferential end (right end as viewed in FIG. 6) of each arcuate cover 21a. As shown in FIG. 5, the lower coupling portion 22b is formed by removing the upper half of the thickness of the second circumferential end of each arcuate cover 21a in a substantially circular shape. A coupling bore 22c extends axially through each lower coupling portion 22b. A coupling projection 22d is formed on each upper coupling portion 22a to be inserted in the coupling bore 22c of the adjacent insulating member 21 (see FIG. 8).

Each coupling projection 22d can be loosely fitted to the corresponding coupling bore 22c. The coupling bores 22c and the coupling projections 22d are non-circular as viewed from the axial direction. As shown in FIG. 6, when the core segments 13 are arranged in a straight line, a space is formed between the inner circumferential surface of each coupling bore 22c and the outer circumferential surface of the corresponding coupling projection 22d along the entire circumference. When the core segments 13 are rotated until the core segments 13 are arranged in an annular form as shown in FIG. 1, the smallest portion of the space between the inner circumferential surface of each coupling bore 22c and the outer circumferential surface of the corresponding coupling projection 22d is reduced to zero. In the state shown in FIG. 1, the inner circumferential surface of each coupling bore 22c contacts the outer circumferential surface of the corresponding coupling projection 22d at two positions on a line orthogonal to a relative rotational axis of the adjacent insulating members 21. In the first embodiment, the coupling bores 22c and the coupling projections 22d have a substantially oval shape as viewed from the axial direction as shown in FIG. 6. The major axis and the minor axis of each coupling projection 22d are smaller than those of the corresponding coupling bore 22c.

A hook 22e is formed at the distal end (lower end as viewed in FIG. 8) of each coupling projection 22d to prevent the coupling projection 22d from falling out of the corresponding coupling bore 22c. The hook 22e extends radially outward from the coupling projection 22d. The hook 22e has a guide surface 22i, which inclines with respect to a plane that is perpendicular to the axis of the coupling projection 22d.

An axial bore 22f extends through each coupling projection 22d. The coupling projections 22d are therefore cylindrical. The axial bores 22f make the coupling projections 22d flexible.

In the first embodiment, each coupling bore 22c and the corresponding coupling projection 22d, which are fitted to each other, form the coupling portion 22. That is, each insulating member 21, which is formed as described above, is attached to one of the core segments 13 in which the arcuate projections 11f, 12f overlap one another in the axial direction. Accordingly, the core segments 13 that are adjacent to each via each coupling portion 22 are rotatably coupled to each other. When each insulating member 21 is attached to the corresponding core segment 13, the axis of the coupling bore 22c and the coupling projection 22d substantially matches the axis of the arcuate projections 11f, 12f and the arcuate recesses 11g, 12g. The adjacent core segments 13 rotate relative to each other about the matched axis. Since each coupling projection 22d is loosely fitted to the corresponding coupling bore 22c, the coupling portions 22 are flexible. In other words, the relative position of the adjacent core segments 13 as viewed from the axial direction can be slightly changed as required. In the first embodiment, a pair of insulating members 21 is attached to one core segment 13 in such a way the insulating members 21 face each other in the axial direction of the core segment 13.

Figure 9:
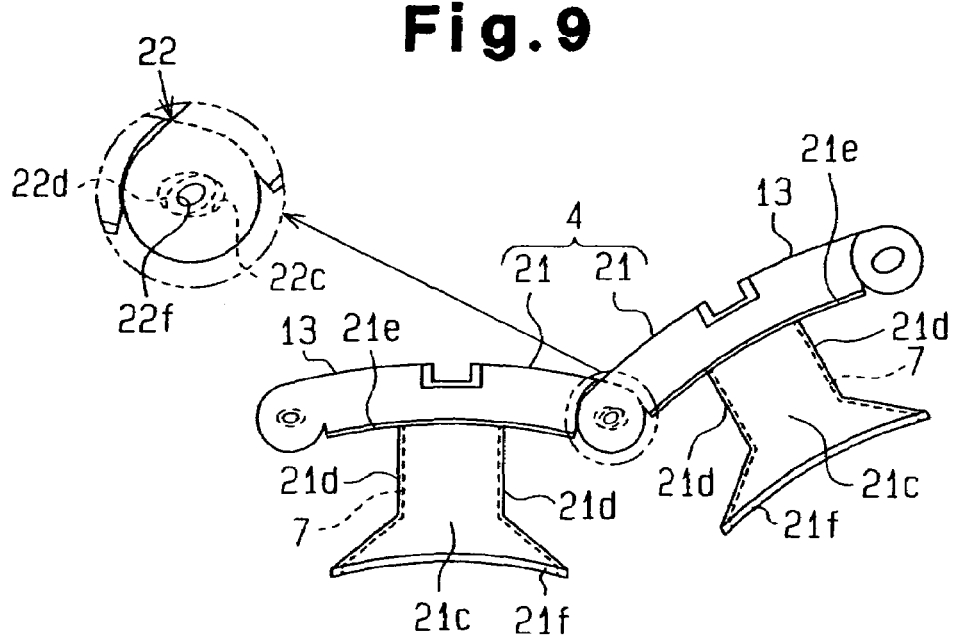
FIG. 9 is a plan view illustrating a state where the core segments and insulating members are rotated to broaden a space between adjacent teeth.
Figure 10:
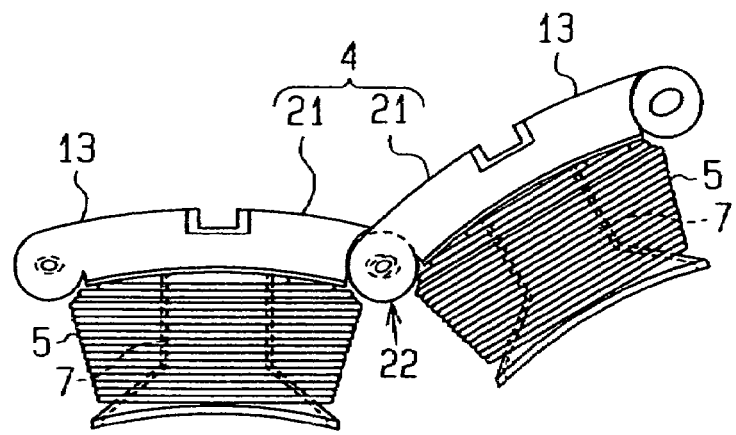
FIG. 10 is a plan view illustrating a state where a coil is wound around each of the core segments and the insulating members shown in FIG. 9.

Each coil 5 is wound around the corresponding tooth 7 to which the pair of insulating members 21 is attached while the space between the distal ends of the adjacent teeth 7 is broadened as shown in FIGS. 9 and 10. The coil 5 is wound around the flat cover 21c and the side covers 21d of each insulating member 21. The core segments 13 are then fixed such that the arcuate portions 13a form the annular portion 8 and the teeth 7 are arranged in a radial pattern. As a result, the stator 1 is formed.

A method for manufacturing the stator 1, which is formed as described above, will now be described.

In a first punching process, the first piece members 11 are punched from plate material, which is not shown.

In a second punching process, the second piece members 12 are punched from plate material, which is not shown.

In a laminating process performed after the first and second punching processes, the first piece members 11 and the second piece members 12 are laminated alternately to form the core segment 13. Then, the separate core segments 13 are moved in the longitudinal direction of the arcuate portions 13a as shown by arrows A in FIG. 4(a). Accordingly, the arcuate projections 11f, 12f of the adjacent core segments 13 overlap one another in the axial direction. That is, the adjacent core segments 13 are fitted to each other (see. FIGS. 4(a) to 4(c)).

In an attaching and coupling process that follows the laminating process, the pair of insulators 4 is attached to the core segments 13 from both sides of the core segments 13 in the axial direction while the arcuate projections 11f, 12f of the adjacent core segments 13 overlap one another in the axial direction. This couples the core segments 13 to one another. More specifically, the attaching and coupling process of the first embodiment includes an insulator coupling process in which insulating members 21 are coupled to one another. In the insulator coupling process, the insulating members 21 (twelve insulating members 21 in this embodiment) are coupled to one another by inserting each coupling projection 22d to the corresponding coupling bore 22c. Accordingly, the insulator 4, which is formed by the insulating members 21, is obtained. As shown in FIG. 6, the insulating members 21 that are coupled to one another are attached to the core segments 13 by covering the core segments 13 from the axial direction while the arcuate projections 11f, 12f of the adjacent core segments 13 overlap one another. At this time, the insulating members 21 are attached to the core segments 13 such that each pair of holding portions 21g holds the corresponding tooth 7 by only moving the insulating members 21 in the axial direction of the core segments 13. In FIG. 6, only two core segments 13 and two insulating members 21 are shown.

In a winding process, which follows the attaching and coupling process, each coil 5 is wound around one of the teeth 7 via the flat cover 21*c* and the side covers 21*d* of each of the pair of insulating members 21 while the space between the distal ends of the adjacent teeth 7 is broadened as shown in FIGS. 9 and 10.

Figure 11:
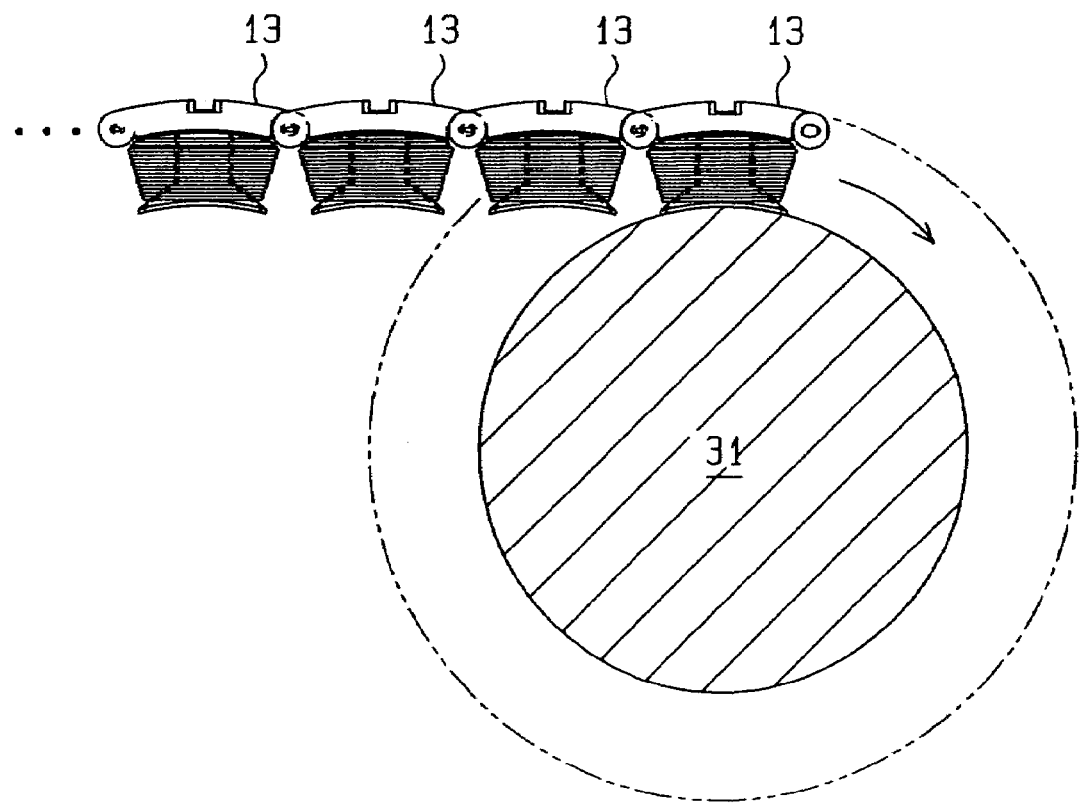
FIGS. 11 and 12 are plan views showing a complete round forming process for a stator.
Figure 12:
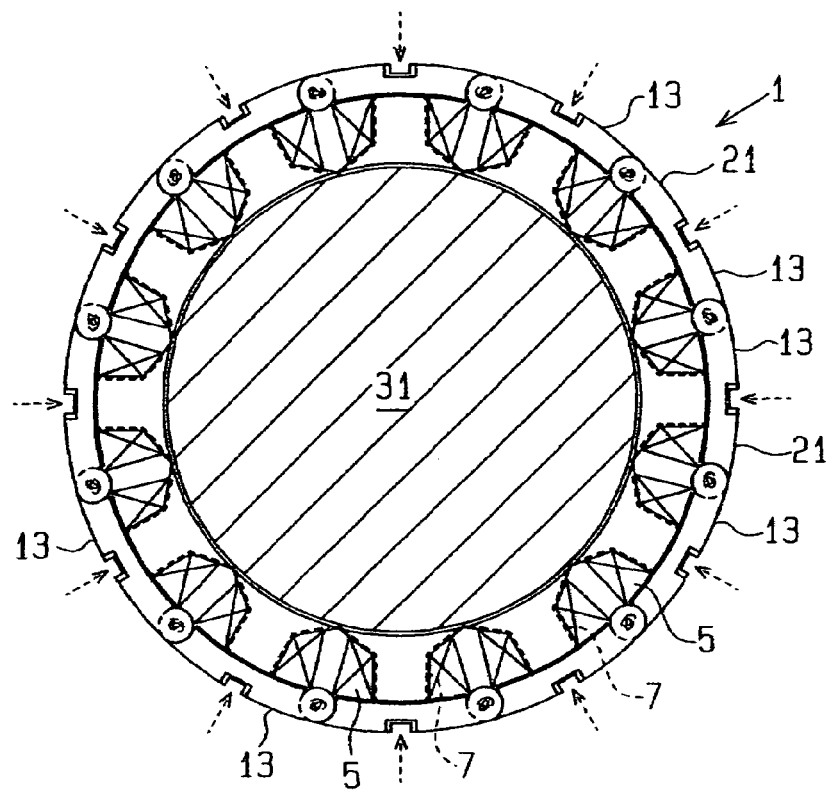

In a complete round forming process, which follows the winding process, the core segments 13, which are coupled to one another, are rolled up as shown in FIG. 11. Pressure is then applied to the core segments 13 from the circumference of the core segments 13 to form a complete round. More specifically, in the complete round forming process, the core segments 13, which are coupled to one another, are rolled up by a core metal 31 having a complete round outer circumference. Each core segment 13 is then pressed from the radially outward direction as shown in FIG. 12 (see the arrows shown in broken lines in FIG. 12). This increases the circularity of the stator 1.

In a welding process, which follows the complete round forming process, the circumferential ends of the arcuate portions 13*a* of the adjacent core segments 13, or the arcuate projections 11*f*, 12*f*, which overlap one another in the axial direction, are welded. In the first embodiment, the number of core segments 13 is twelve. Therefore, the number of welding portions is twelve. For example, laser welding is performed. As a result, the core segments are fixed to one another and the stator 1 is completed.

The first embodiment of the present invention provides the following advantages.

(1) When the core segments 13 are arranged in an annular form, the arcuate projections 11*f*, 12*f* of the adjacent core segments 13 overlap one another. Therefore, a linear space does not extend in the axial direction between the adjacent core segments 13. This reduces the magnetic resistance between the adjacent arcuate portions 13*a* and forms a reliable magnetic circuit. This also prevents the core segments 13 from being displaced in the axial direction.

Furthermore, the arcuate plate 11*a* of each first piece member 11 has the arcuate projection 11*f* and the arcuate recess 11*g*, and the arcuate plate 12*a* of each second piece member 12 has the arcuate projection 12*f* and the arcuate recess 12*g*. Therefore, the adjacent core segments 13 are permitted to rotate relative to each other with the arcuate projections 11*f*, 12*f* of the adjacent core segments 13 overlapping one another in the axial direction. The adjacent core segments 13 are rotatably coupled to each other with the corresponding coupling portion 22 of the insulator 4 easily with the arcuate projections 11*f*, 12*f* overlapping one another. Therefore, the adjacent core segments 13 can be rotated relative to each other while being kept coupled to each other to broaden the space between the distal ends of the adjacent teeth 7. As a result, each coil 5 is easily wound around the corresponding tooth 7 without interference from the adjacent tooth 7. Furthermore, the core segments 13 are easily arranged in an annular form by only rotating the core segments 13, to which the coils 5 are wound, relative to one another. With this structure, a coupling portion need not be formed on each core segment 13 to couple the core segments 13 with one another. Also, pins such as those used in the prior art need not be provided to couple the adjacent core segments 13. This contributes to reducing the number of parts and the types of parts.

(2) Each coupling projection 22*d* is loosely fitted to the corresponding coupling bore 22*c*. The insulating members 21 are formed of flexible resin material. Therefore, the coupling portions 22 are flexible and permit slight changes in the relative position between the adjacent core segments 13. Thus, as compared to the prior art, the circularity of the annular portion 8 is improved. More specifically, in the prior art in which pins are used, the machining accuracy of the hard piece members (particularly, the machining accuracy of the circumferential ends of each piece member and the pin holes) must be increased to obtain high circularity. In contrast, when the coupling portions 22 of the insulator 4 are flexible as in the first embodiment, the coupled core segments 13 can be reliably wound around the core metal 31 to closely contact the core metal 31 even if the accuracy of the insulator 4 and the piece members 11, 12 is relatively low. In this state, the circumferential ends of the adjacent arcuate portions 13*a* are fixed to each other by welding. As a result, an annular portion 8 having high circularity is easily obtained. Since the insulating members 21 are formed of flexible resin material, the insulating members 21 can deform to compensate for slight errors. Thus, the insulating members 21 need not be formed with high accuracy.

(3) The arcuate cover 21*a* of each insulating member 21 has the coupling projection 22*d* on the first end of the arcuate cover 21*a* and the coupling bore 22*c* on the second end of the arcuate cover 21*a*. The coupling portion 22 is easily formed by inserting the coupling projection 22*d* of one of the adjacent insulating members 21 into the coupling bore 22*c* of the other one of the adjacent insulating members 21. When forming each core segment 13, the lamination of the first and second piece members 11, 12, the coupling of the insulating members 21, and the attachment of the insulating members 21 to the core segments 13 are all performed wile moving the components in the same direction. This facilitates manufacturing processes for the stator core 6 and permits automation of the manufacturing while preventing the manufactured device from being complicated and enlarged. Furthermore, in the first embodiment, only one type of insulating member 21 needs to be prepared. This reduces the manufacturing cost.

(4) As shown in FIG. 6, the coupling bores 22*c* and the coupling projections 22*d* have a substantially oval shape as viewed from the axial direction. When the core segments 13 are arranged in a straight line as shown in FIG. 6, a space is formed between the inner circumferential surface of each coupling bore 22*c* and the outer circumferential surface of the corresponding coupling projection 22*d* along the entire circumference. Therefore, the insulating members 21 are easily coupled to each other without determining the position with high accuracy. When the core segments 13 are arranged in an annular form as shown in FIG. 1, the inner circumferential surface of each coupling bore 22*c* contacts the outer circumferential surface of the corresponding coupling projection 22*d* at two positions. Therefore, the core segments 13 that are coupled to each other are prevented from being displaced relative to each other. This suppresses noise caused by such displacement. Furthermore, in a state where the distance between the teeth 7 of the adjacent core segments 13 is broadened as shown in FIG. 9, the inner circumferential surface of each coupling bore 22*c* contacts the outer circumferential surface of the corresponding coupling projection 22*d* at two positions. Therefore, when winding each coil 5 to the corresponding tooth 7, the adjacent core segments 13 that are coupled to each other are prevented from being displaced from each other. This permits an operator to smoothly wind each coil 5 on the corresponding tooth 7.

(5) The hook 22*e* having the guide surface 22*i* is formed at the distal end (lower end as viewed in FIG. 8) of each coupling projection 22*d*. The hook 22*e* prevents each coupling projection 22*d* from falling out of the corresponding coupling bore 22c. The guide surface 22i of the hook 22e facilitates inserting each coupling projection 22d into the corresponding coupling bore 22c.

(6) The axial bore 22f is formed in each coupling projection 22d. Therefore, when inserting each coupling projection 22d into the corresponding coupling bore 22c, the coupling projection 22d easily flexes thereby facilitating inserting the coupling projection 22d into the coupling bore 22c.

(7) When each insulating member 21 is attached to the corresponding tooth 7, the holding portions 21g formed on the pair of side covers 21d of the insulating member 21 holds the tooth 7. Therefore, each insulating member 21 is easily kept attached to the corresponding core segment 13.

(8) The pair of insulators 4 is attached to the group of successive core segments 13 from the axial direction of the group of core segments 13. Therefore, the adjacent core segments 13 are reliably maintained in a coupled state.

(9) The core segments 13 are easily coupled to one another only by attaching the insulators 4, each of which is formed of coupled insulating members 21, to the group of core segments 13 in which arcuate projections 11f, 12f overlap one another. In this case, several insulating members 21 are attached to several core segments 13 at once. This facilitates the attaching process and reduces the time and cost spent for the attaching process.

A second embodiment of the present invention will now be described with reference to FIGS. 13 to 16.

The insulator 4 shown in FIG. 5 is formed by several identical insulating members 21, which are coupled to one another. In the second embodiment, the insulator 4 is formed by alternately arranging two types of insulating members as shown in FIGS. 13 to 16. That is, the insulator 4 is formed by first insulating members 33 (see FIG. 13) and second insulating members 34 (see FIG. 15), which are coupled to one another.

More specifically, the first and second insulating members 33, 34 are formed of insulative resin material. As the insulating member 21 shown in FIG. 5, each insulating member 33 or 34 includes an arcuate cover 33a or 45a, an inner circumferential cover 33b or 34b, a flat cover 33c or 34c, and a pair of side covers 33d or 34d. Each arcuate cover 33a or 34a has a restricting wall for preventing the coil 5 wound around the corresponding tooth 7 from protruding radially outward. The restricting wall has a pair of grooves 33e or 34e. The ends of each coil 5 can be secured to the grooves 33e or 34e. The flat cover 33c or 34c has an inner restricting wall 33f or 34f at the end corresponding to the distal end of the tooth 7 (the lower end as viewed in FIGS. 14 and 16) for preventing the coil 5 wound around the corresponding tooth 7 from protruding radially inward.

Coupling portions are formed at portions of the insulator 4 that correspond to the circumferential ends of the arcuate portion 13a of each core segment 13. That is, the coupling portions are formed at the circumferential ends of the arcuate covers 33a, 34a to rotatably couple the adjacent core segments 13.

Figure 13:
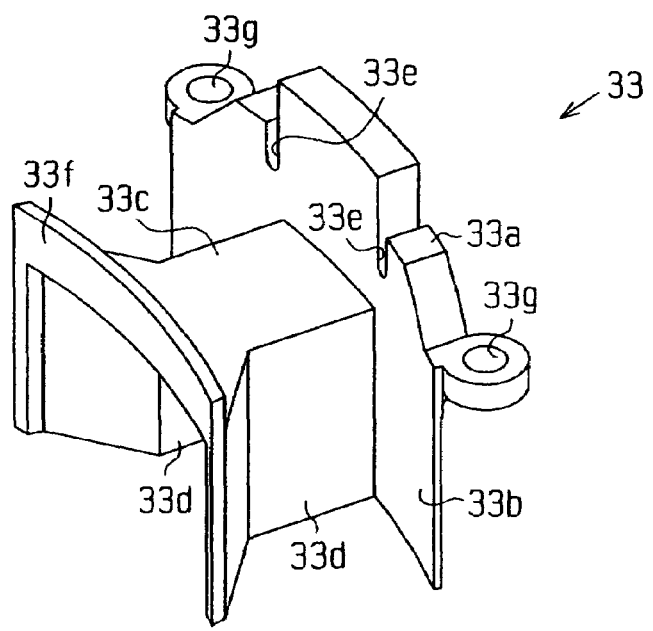
FIG. 13 is a perspective view illustrating a first insulating member according to a second embodiment of the present invention.
Figure 14:
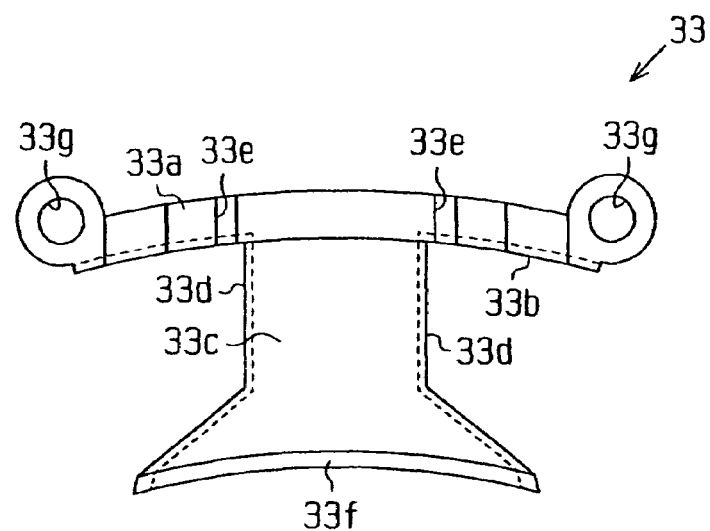
FIG. 14 is a plan view illustrating the first insulating member shown in FIG. 13.
Figure 15:
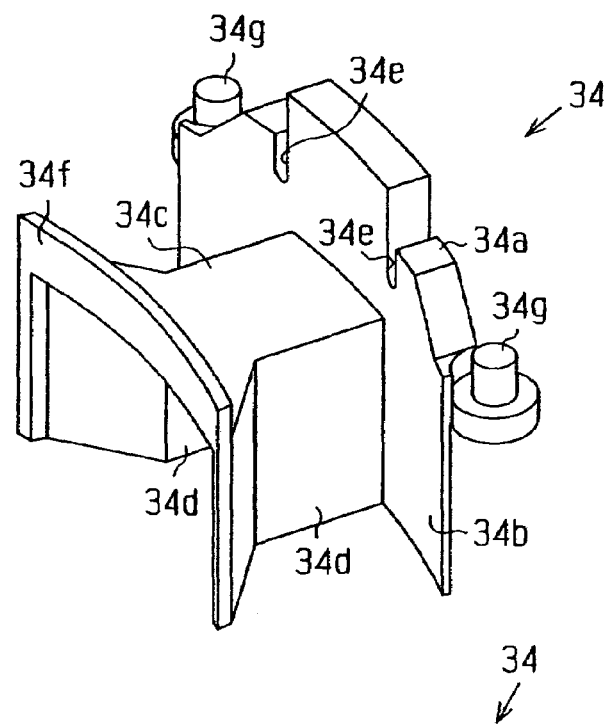
FIG. 15 is a perspective view illustrating a second insulating member according to the second embodiment.
Figure 16:
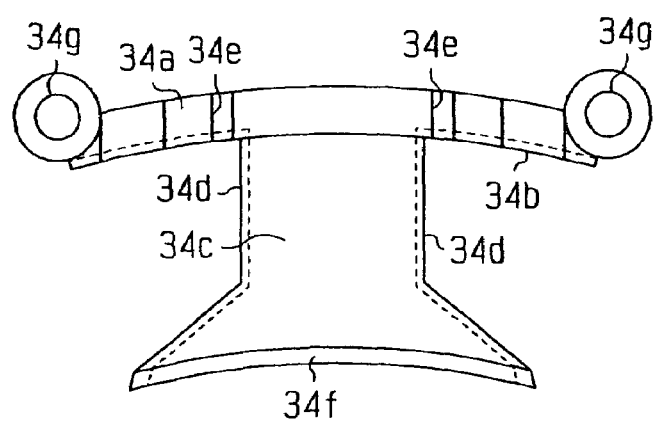
FIG. 16 is a plan view illustrating the second insulating member shown in FIG. 15.

More specifically, as shown in FIGS. 13 and 14, coupling bores 33g are formed on the circumferential ends of the arcuate cover 33a of each first insulating member 33 and extend in the axial direction. The coupling bores 33g have circular shapes as viewed from the axial direction. As shown in FIGS. 15 and 16, coupling projections 34g are formed on the circumferential ends of the arcuate covers 34a of each second insulating member 34. The coupling projections 34g extend in the axial direction and can be inserted into the coupling bores 33g. The coupling projections 34g have circular shape as viewed from the axial direction. The coupling bores 33g and the coupling projections 34g, which are coupled to each other, form the coupling portions in the second embodiment. The insulator 4, which is formed by alternately arranging the first and second insulating members 33, 34, is attached to the core segments 13 (see FIG. 4(c)) in which arcuate projections 11f, 12f overlap one another in the axial direction. As a result, the core segments 13 that are adjacent to each other via each coupling portion are rotatably coupled to each other by the engagement of each coupling bore 33g with the corresponding coupling projection 34g. When the insulating members 33, 34 are attached to the core segments 13, the axes of the coupling bores 33g and the coupling projections 34g substantially match the axes of the arcuate projections 11f, 12f and the arcuate recesses 11g, 12g. Two insulators 4, each of which is formed by coupling the first and second insulating members 33, 34, are prepared and attached to the group of core segments 13 to face each other.

In the second embodiment, one insulator 4 is formed by coupling the total of twelve alternately arranged first and second insulating members 33, 34 to one another by inserting each coupling projection 34g into the corresponding coupling bore 33g.

In the second embodiment, the first insulating member 33 having the pair of coupling bores 33g and the second insulating member 34 having the pair of coupling projections 34g are prepared. Therefore, the insulating members 33, 34 can be assembled at once by, for example, arranging the first insulating members 33 and the second insulating members 34 on different planes and moving one of the groups of insulating members toward the other one of the groups of insulating members.

A third embodiment of the present invention will now be described with reference to FIGS. 17 to 32.

Figure 17:
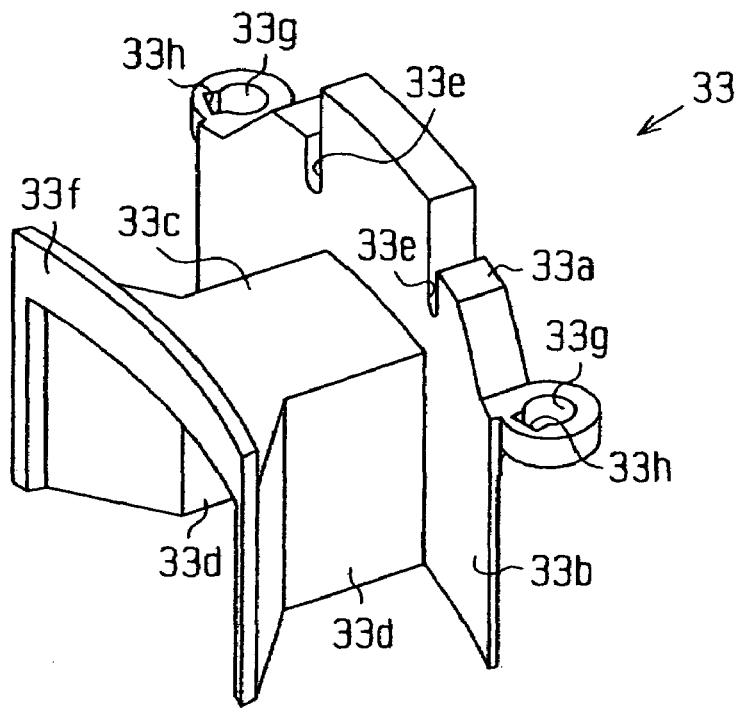
FIG. 17 is a perspective view illustrating a first insulating member according to a third embodiment of the present invention.
Figure 18:
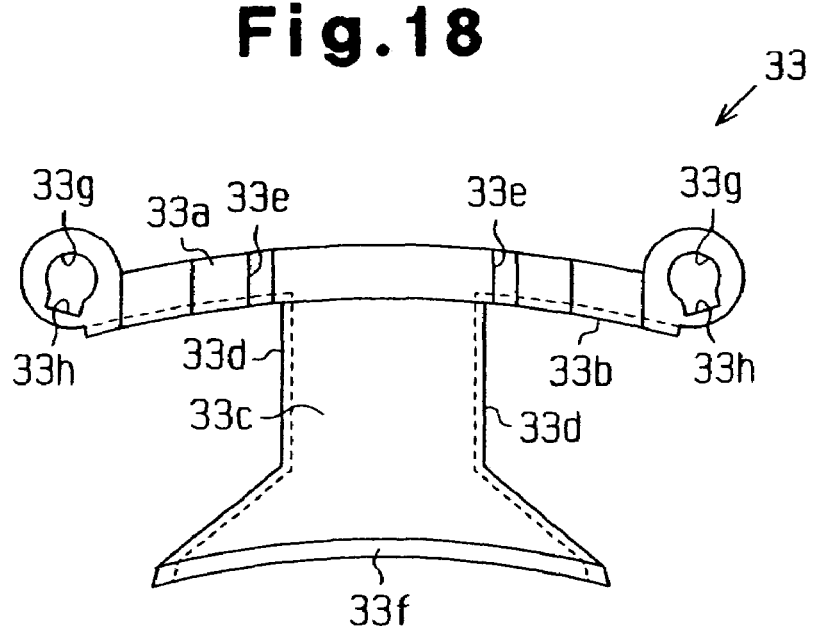
FIG. 18 is a plan view illustrating the first insulating member shown in FIG. 17.

In the third embodiment, the first and second insulating members 33, 34 of the second embodiment illustrated in FIGS. 13 to 16 are slightly modified. As shown in FIGS. 17 and 18, a notch 33h is formed in each coupling bore 33g of the first insulating member 33 according to the third embodiment. The notch 33h, extends in the radial direction. The pair of notches 33h of each first insulating member 33 extends in directions to separate from each other toward the lower side, that is, toward the inner restricting wall 33f as shown in FIG. 18.

Figure 19:
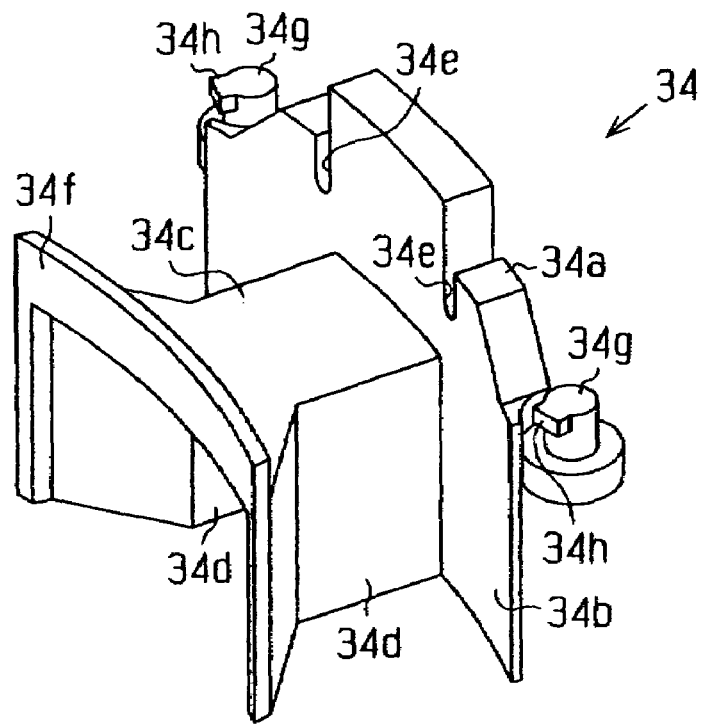
FIG. 19 is a perspective view illustrating a second insulating member according to the third embodiment.
Figure 20:
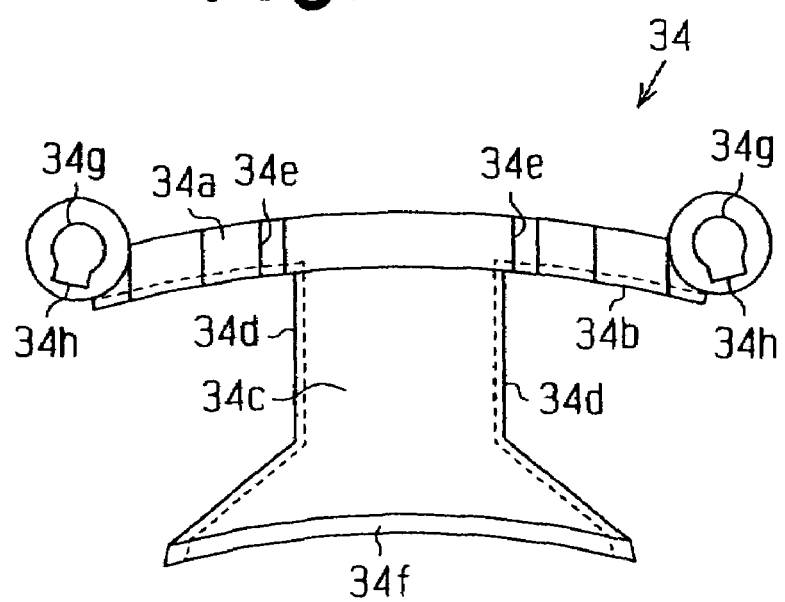
FIG. 20 is a plan view illustrating the second insulating member shown in FIG. 19.

As shown in FIGS. 19 and 20, a hook 34h is formed at the distal end of each coupling projection 34g of the second insulating member 34. The shape of the hooks 34h matches the shape of the notches 33h. The hooks 34h permit the coupling projections 34g to be inserted into the coupling bores 33g when the first insulating member 33 and the second insulating member 34 are arranged at a predetermined angle (allowable angle). However, when the first insulating member 33 and the second insulating member 34 are arranged at an angle other than the allowable angle, the hooks 34h prevent the coupling projections 34g from being inserted into or removed from the coupling bores 33g. That is, the hooks 34h match the notches 33h only when the first insulating member 33 and the second insulating member 34 are arranged at the allowable angle. As shown in FIG. 20, the pair of hooks 34h of the second insulating member 34 extends in directions to separate them from each other toward the lower side, that is, toward the inner restricting wall 34f.

Figure 21:
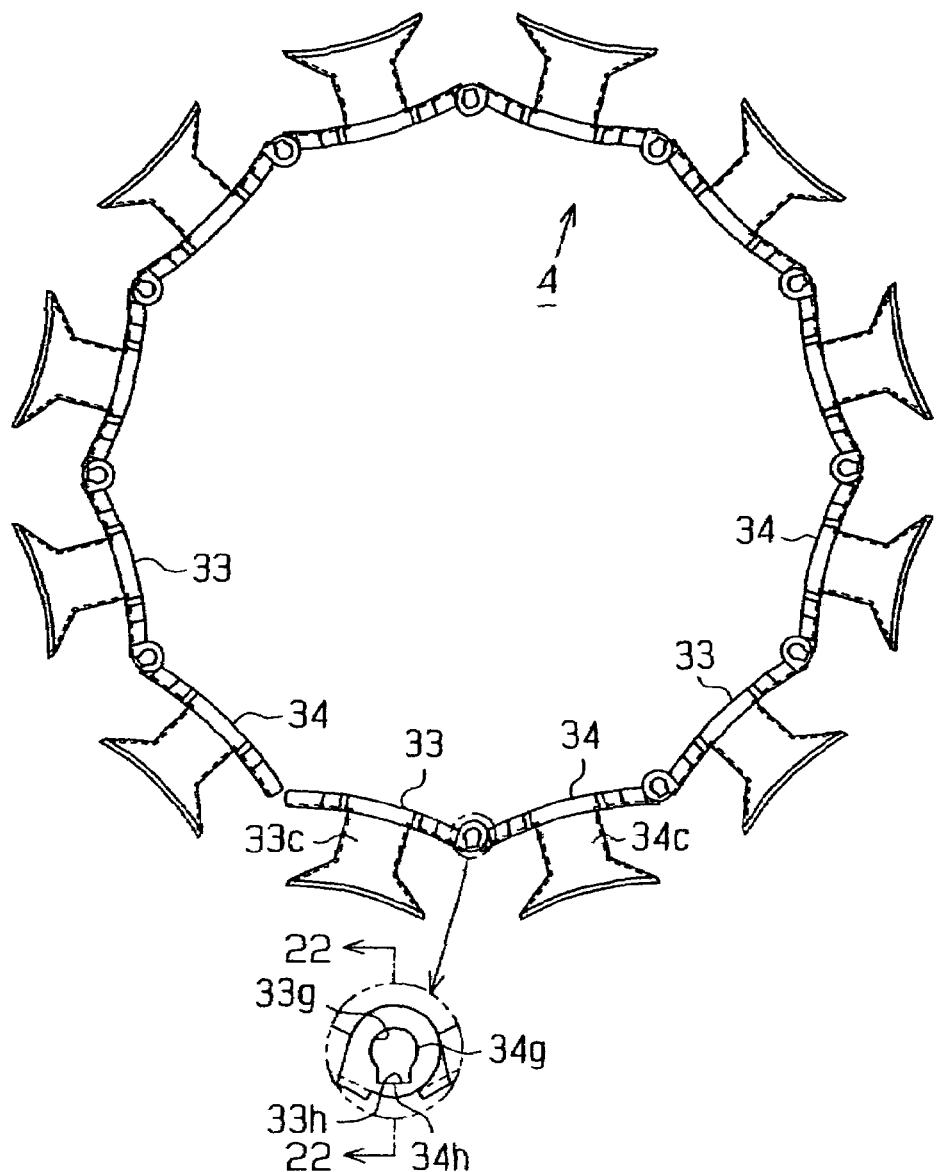
FIG. 21 is a plan view illustrating a state where the first and second insulating members are located at an allowable angle.

The allowable angle is set to an angle formed when the total of twelve first and second insulating members 33, 34 are arranged in an annular form such that the portions that cover the teeth 7 face radially outward as shown in FIG. 21.

Figure 22:
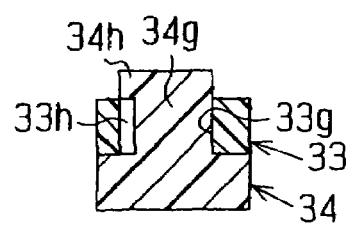
FIG. 22 is a cross-sectional view taken along line 22-22 in FIG. 21.

When the first and second insulating members 33, 34 are arranged at the allowable angle, each hook 34h matches the corresponding notch 33h as shown in FIG. 22, and permits each coupling projection 34g to be inserted into the corresponding coupling bore 33g. Therefore, when the first and second insulating members 33, 34 are arranged in a state as shown in FIG. 21, each coupling projection 34g is inserted into the corresponding coupling bore 33g so that the first and second insulating members 33, 34 are rotatably coupled to each other. Among the total of twelve first and second insulating members 33, 34, which are coupled to one another, one of the first insulating members 33 only has one coupling bore 33g and one of the second insulating members 34 has only one coupling projection 34g. The first insulating member 33 that has only one coupling bore 33g and the second insulating member 34 that has only one coupling projection 34g are located at the ends of the series of coupled insulating members.

Figure 23:
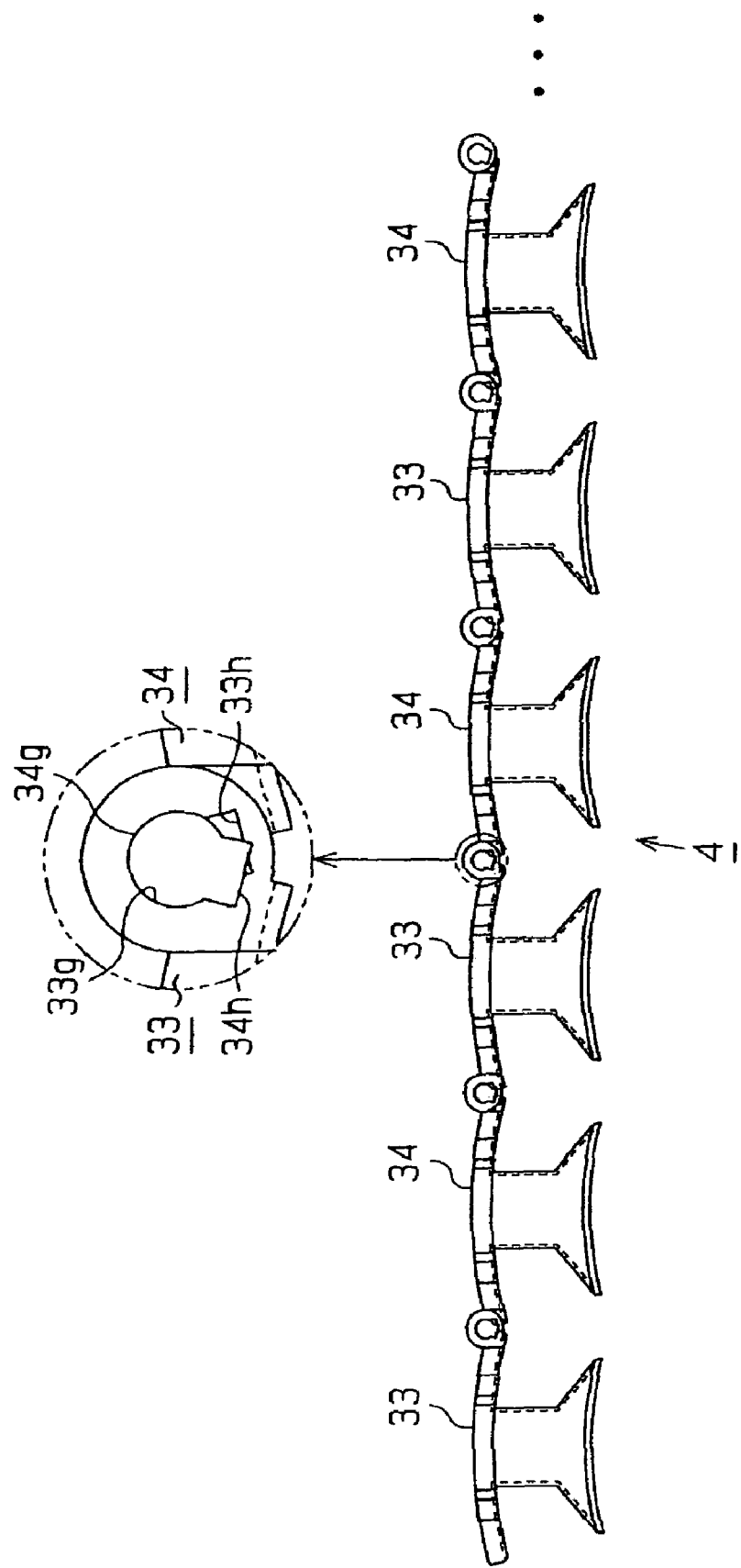
FIG. 23 is a plan view illustrating a state where the first and second insulating members, which are coupled to each other, are arranged in a straight line.

FIG. 23 shows the total of twelve first and second insulating members 33, 34 that are coupled to one another in a straight line. In the third embodiment, each coil 5 is wound around the corresponding insulating member 33 or 34, which surrounds one of the teeth 7, when the first and second insulating members 33, 34 are arranged as shown in FIG. 23. At this time, since the angle between each first insulating member 33 and the adjacent second insulating member 34 is not the allowable angle, each hook 34h does not match the corresponding notch 33h (see enlarged view in FIG. 23). Therefore, each coupling projection 34g is prevented from falling out of the corresponding coupling bore 33g.

Figure 24:
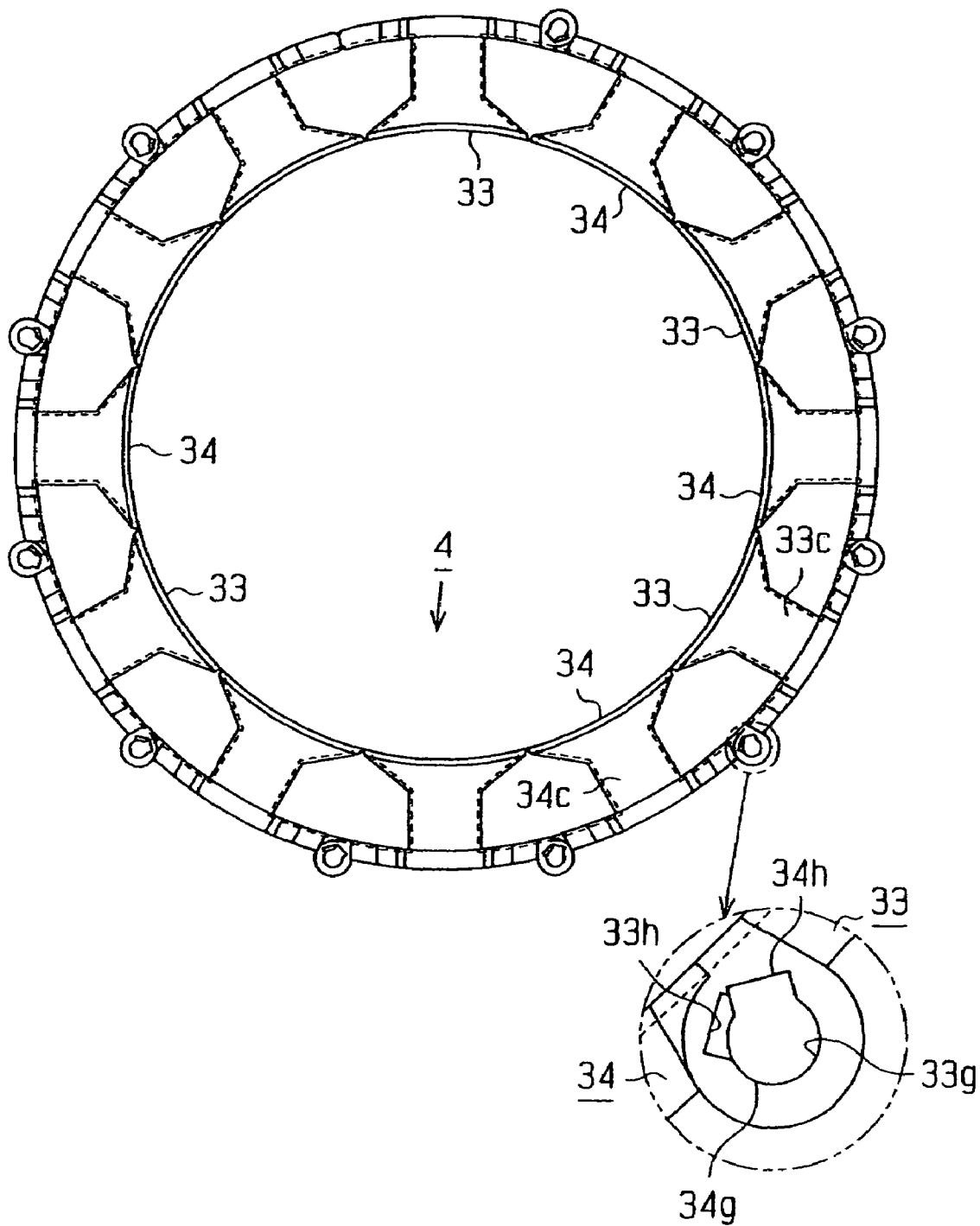
FIG. 24 is a plan view illustrating a state where the first and second insulating members, which are coupled to each other, are arranged in an annular form.

FIG. 24 shows a state where the total of twelve first and second insulating members 33, 34 are arranged in an annular form such that portions covering the teeth 7 face radially inward. In this state, the insulator 4 formed by the total of twelve first and second insulating members 33, 34 has a shape corresponding to the annular stator core 6. At this time, since the angle between each first insulating member 33 and the adjacent second insulating member 34 is not the allowable angle, each hook 34h does not match the corresponding notch 33h (see enlarged view in FIG. 24). Therefore, each coupling projection 34g is prevented from falling out of the corresponding coupling bore 33g.

A method and device for manufacturing the stator 1 will now be described.

Figure 25:
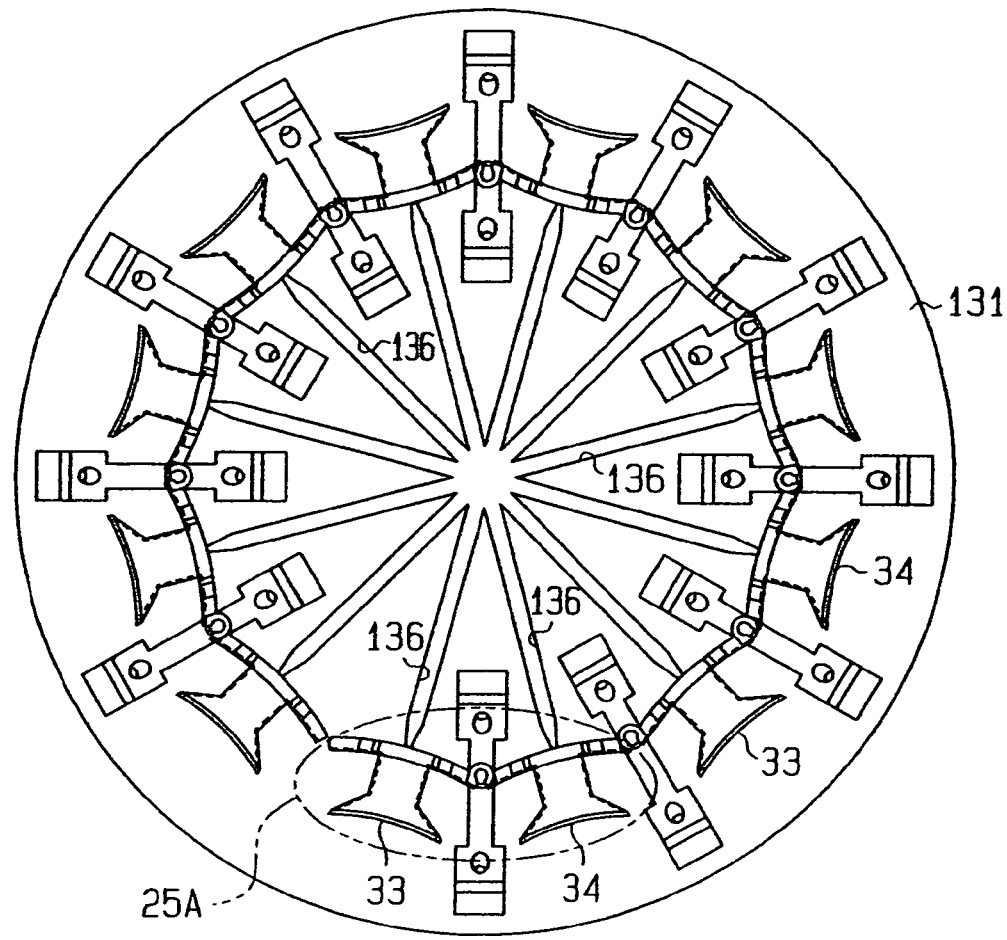
FIG. 25 is a plan view illustrating a manufacturing device for molding the insulating members shown in FIGS. 17 to 20.
Figure 26:
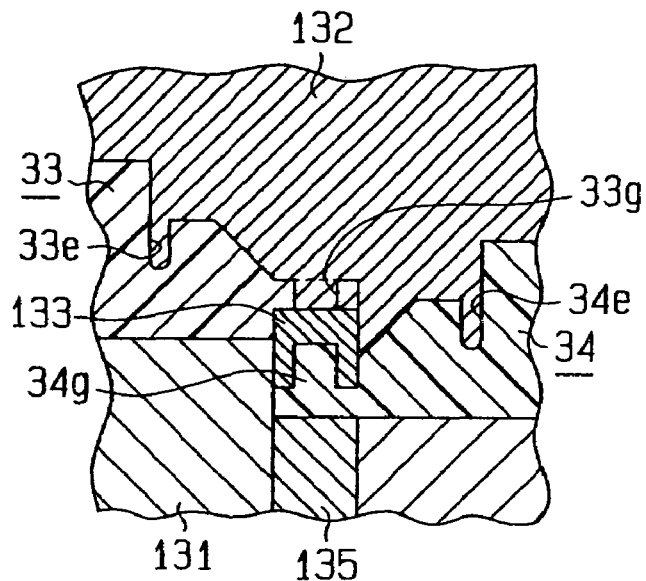
FIG. 26 is a cross-sectional view taken along line 26-26 in FIG. 25A.
Figure 27:
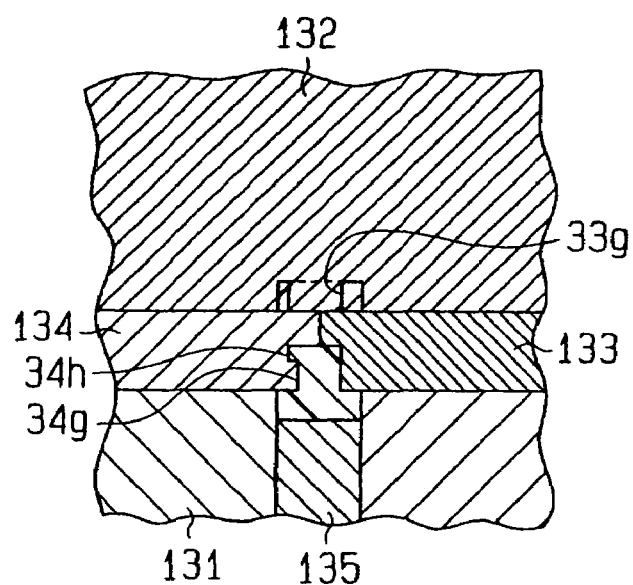
FIG. 27 is a cross-sectional view taken along line 27-27 in FIG. 25A.

As shown in FIGS. 25 to 27, the manufacturing device (molding equipment) includes a lower mold 131, an upper mold 132, a plurality of slide cores 133, 134, and a plurality of push-out members 135. FIG. 25 is a plan view illustrating a state where the upper mold 132 is separated from the lower mold 131 after the first and second insulating members 33, 34 are molded. Therefore, the upper mold 132 is not shown in FIG. 25. FIGS. 26 and 27 show the upper mold 132. The molding equipment molds the first and second insulating members 33, 34 such that the first insulating members 33 are axially displaced from the second insulating members 34 and the angle between the adjacent first and second insulating members 33, 34 is the allowable angle (see FIG. 9).

The lower mold 131 defines a lower mold cavity having a shape that corresponds to the lower part of the first and second insulating members 23, 24, that is, mainly a part lower than the under surface of the flat cover 33c, 34c. The upper mold 132 defines an upper mold cavity having a shape that corresponds to the upper part of the first and second insulating members 33, 34, that is, mainly the part higher than the under surface of the flat cover 33c, 34c. The lower mold 131 and the upper mold 132 mold the total of twelve first and second insulating members 33, 34 (six each) such that the first and second insulating members 33, 34 are in the state shown in FIG. 21 as viewed from the top. As shown in FIG. 26, in the lower mold 131 and the upper mold 132, mold cavity portions corresponding to the first insulating members 33 are axially displaced from mold cavity portions corresponding to the second insulating members 34. Therefore, when the first and second insulating members 33, 34 are molded to be arranged alternately, the first insulating members 33 are located axially upward and the second insulating members 34 are located axially downward. As shown in FIG. 25, the lower mold 131 and the upper mold 132 define resin injection passages 136, which extend radially outward from the center of the lower and upper molds 131, 132 to the mold cavities.

Figure 25A:
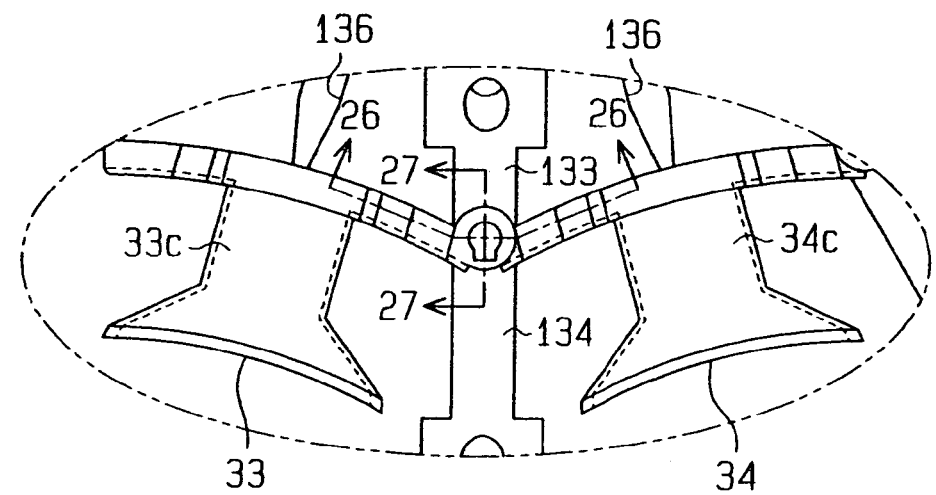
FIG. 25A is an enlarged view of a portion surrounded by an oval in FIG. 25.

As shown in FIGS. 25A and 27, pairs of inner and outer slide cores 133 and 134 are formed at positions corresponding to the coupling bores 33g and the coupling projections 34g and extend in the radial direction. The inner and outer slide cores 133, 134 are movable in the radial direction and define cavities for molding the coupling projections 34g. As shown in FIGS. 26, 27, the push-out members 135 are inserted in the lower mold 131 such that the push-out members 135 can move up and down at positions corresponding to the coupling bores 33g and the coupling projections 34g.

In a molding process, molten resin is injected into the mold cavities in the molding equipment through the resin injection passages 136. As a result, the total of twelve first and second insulating members 33, 34 (six each) are molded in the mold cavities. At this time, the first insulating members 33 are axially displaced from the second insulating members 34 (see FIG. 26) and the angle between the adjacent first and second insulating members 33, 34 is the allowable angle (see FIG. 25A).

After the molding process, that is, after the resin is hardened, a mold release process is performed. The mold release process includes an upper mold release process, a coupling process, and a lower mold release process.

Figure 28:
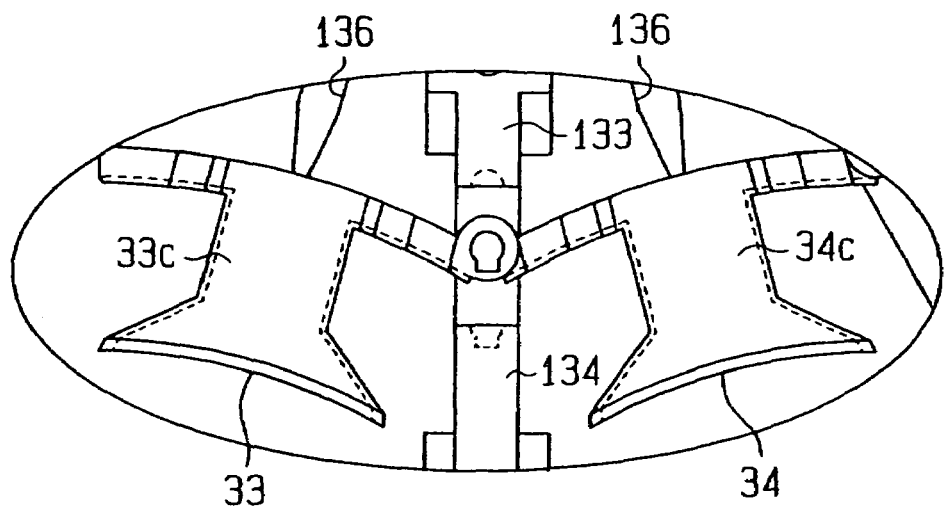
FIG. 28 is an enlarged view corresponding to FIG. 25A showing an upper mold release process.
Figure 29:
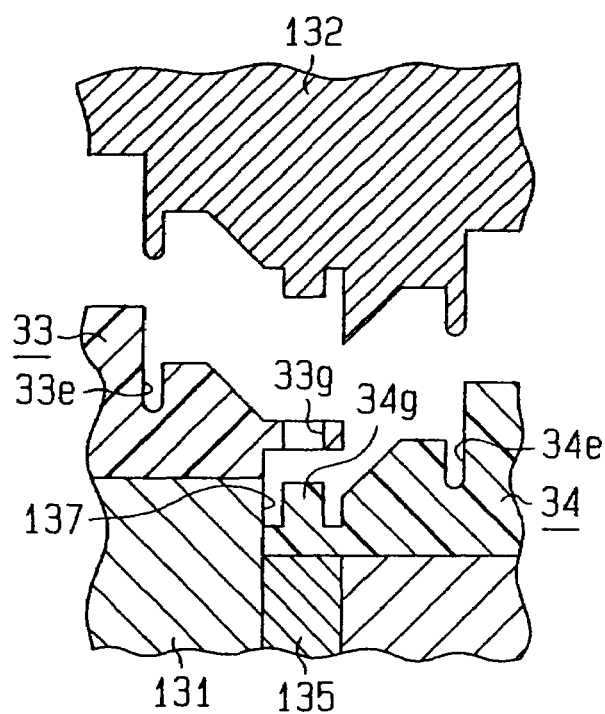
FIG. 29 is a cross-sectional view corresponding to FIG. 26 showing an upper mold release process.
Figure 30:
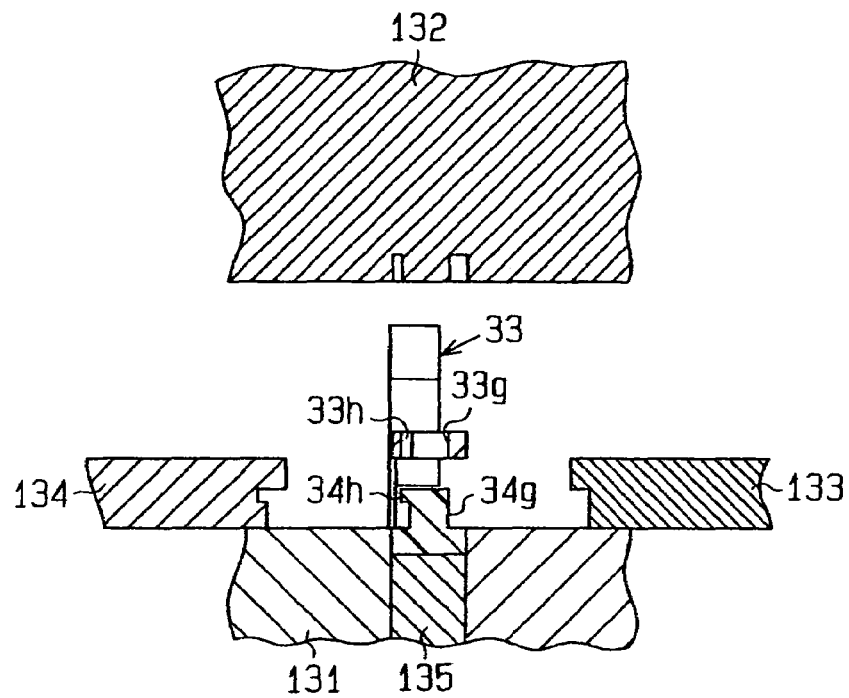
FIG. 30 is a cross-sectional view corresponding to FIG. 27 showing an upper mold release process.

In the upper mold release process, as shown in FIGS. 28 to 30, the upper mold 132 is moved upward and the inner and outer slide cores 133, 134 are moved in the radial direction such that the inner and outer slide cores 133, 134 separate from each other. FIG. 28 shows a change from the state shown in FIG. 25A, FIG. 29 shows a change from the state shown in FIG. 26, and FIG. 30 shows a change from the state shown in FIG. 27.

Figure 31:
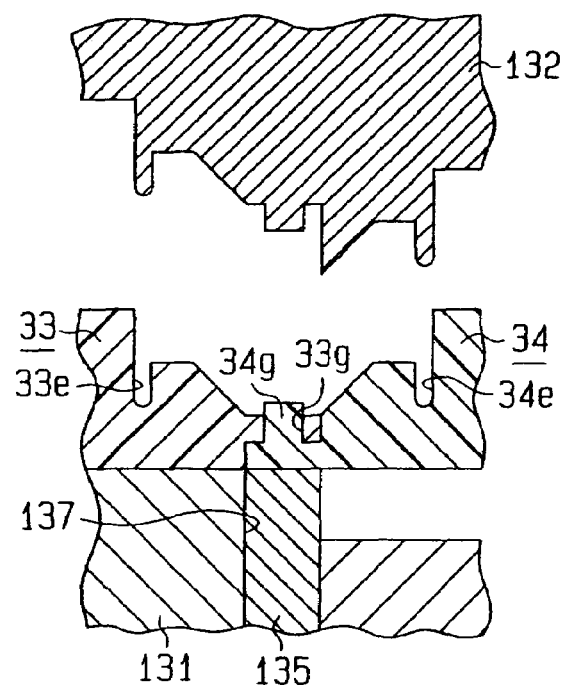
FIG. 31 is a cross-sectional view corresponding to FIG. 29 showing a coupling process.
Figure 32:
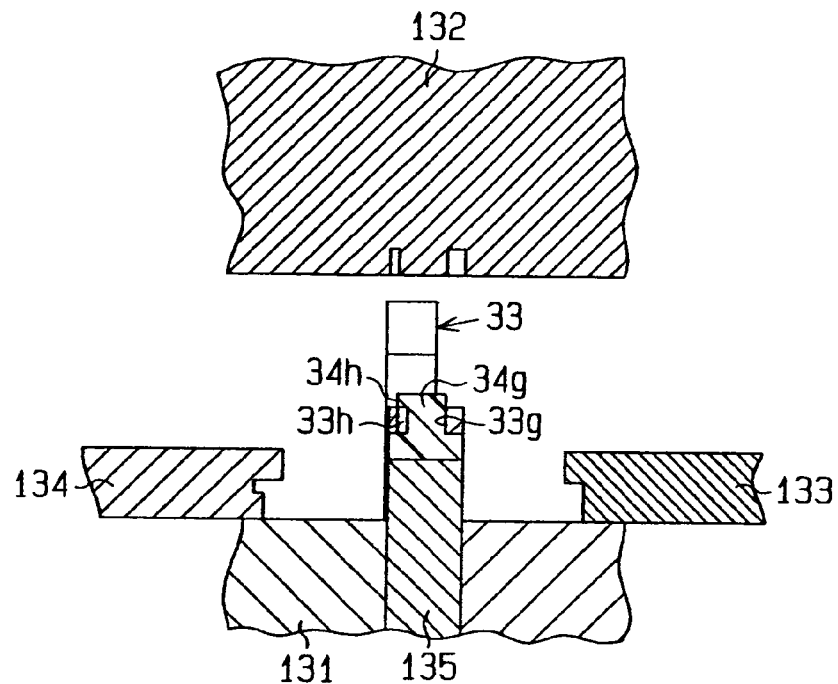
FIG. 32 is a cross-sectional view corresponding to FIG. 30 showing a coupling process.

In the subsequent coupling process, either of the first insulating members 33 or the second insulating members 34 are moved in the axial direction while the first and second insulating members 33, 34 are still located at the allowable angle. Accordingly, each coupling projection 34g is inserted into the corresponding coupling bore 33g thereby coupling the first and second insulating members 33, 34 to one another. More specifically, in the coupling process, as shown in FIGS. 31 and 32, each push-out member 135 moves to a first push-out position to lift the corresponding second insulating member 34 upward. At this time, each second insulating member 34 slides along a corresponding one of the contact surfaces 137 (see FIG. 31) formed in the lower mold 131. Since the adjacent first and second insulating members 33, 34 define the allowable angle, the hooks 34h match the notches 33h. Therefore, each coupling projection 34g is inserted into the corresponding coupling bore 33g thereby rotatably coupling the adjacent first and second insulating members 33, 34. FIG. 31 shows a change from the state shown in FIG. 29 and FIG. 32 shows a change from the state shown in FIG. 30.

In the following lower mold release process, each push-out member 135 is further moved upward to a second push-out position to lift the corresponding first insulating member 33 with the corresponding second insulating member 34 (not shown). As a result, the first and second insulating members 33, 34 are removed from the mold.

In a serialization process, which follows the mold release process, the first and second insulating members 33, 34 are arranged in a straight line as shown in FIG. 23. In this state, the hooks 34*h* do not match the notches 33*h* (see the enlarged view in FIG. 23). Therefore, each coupling projection 34*g* can be removed from the corresponding coupling bore 33*g*.

In an attachment process, the group of first and second insulating members 33, 34, or the insulator 4, is attached to the group of core segments 13 arranged in a straight line as shown in FIGS. 4(*a*) to 4(*c*). This rotatably couples the adjacent core segments 13 to each other. The attaching process is the same as that explained in the first embodiment illustrated in FIGS. 1 to 12. Manufacture of the core segments 13 is also the same as that explained in the first embodiment illustrated in FIGS. 1 to 12.

The first piece members 11 are punched from plate material to be arranged in a straight line, and the second piece members 12 are punched from plate material to be arranged in a straight line. The first piece members 11 arranged in a straight line and the second piece members 12 arranged in a straight line may be laminated alternately to form the group of core segments 13 as shown in FIGS. 4(*a*) to 4(*c*). This facilitates the series of processes from the punching of the piece members 11, 12 to the attachment of the insulators 4. The piece members 11, 12 are efficiently punched from plate material reducing the amount of plate remaining after punching (waste material). Accordingly, waste material is reduced.

In a coiling process, each coil 5 is wound about one of the core segments 13 to which the insulators 4 are attached. At this time, the core segments 13 are still arranged in a straight line, that is, the teeth 7 are arranged parallel to one another (see FIGS. 4(*a*) to 4(*c*)).

The next complete round forming process is the same as that explained with reference to FIGS. 11 and 12. The stator 1 is completed after the complete round forming process is performed.

The third embodiment provides the following advantages.

The first and second insulating members 33, 34 are permitted to be coupled to one another and separated from one another only when the first and second insulating members 33, 34 are arranged at the predetermined allowable angle. Therefore, after coupling the first and second insulating members 33, 34 at the allowable angle, the first and second insulating members 33, 34 are maintained in the coupled state by only arranging the first and second insulating members 33, 34 at an angle other than the allowable angle. This facilitates coupling of the first and second insulating members 33, 34 and prevents the first and second insulating members 33, 34 from being accidentally separated from one another. For example, when winding each coil 5, the first and second insulating members 33, 34 are maintained at an angle where each coupling projection 34*g* cannot be removed from the corresponding coupling bore 33*g*. Therefore, when winding each coil 5, the first and second insulating members 33, 34, or the core segments 13, are reliably maintained as being coupled to one another.

The first and second insulating members 33, 34 are molded such that the first and second insulating members 33, 34 are displaced in the axial direction and are arranged at the allowable angle. Moving either of the first or second insulating members 33, 34 that are maintained at the allowable angle in the axial direction inserts each coupling projection 34*g* into the corresponding coupling bore 33*g* thereby coupling the first and second insulating members 33, 34 to one another. In this case, the series of processes from molding to coupling the first and second insulating members 33, 34 is performed without changing the angle between the first and second insulating members 33, 34. Therefore, the first and second insulating members 33, 34 that are coupled to one another, or the insulators 4, are easily obtained.

The push-out members 135 of the molding equipment lift the molded second insulating members 34 so that each coupling projection 34*g* is inserted into the corresponding coupling bore 33*g*. This further facilitates coupling the first and second insulating members 33, 34.

When being raised by the push-out members 135, each second insulating member 34 slides along the corresponding contact surface 137 of the lower mold 131. This prevents the second insulating members 34 from being displaced while being raised and reliably inserts each coupling projection 34*g* into the corresponding coupling bore 33*g*.

The above mentioned molding process executed by the molding equipment is also applicable to the second embodiment illustrated in FIGS. 13 to 16.

Figure 33:
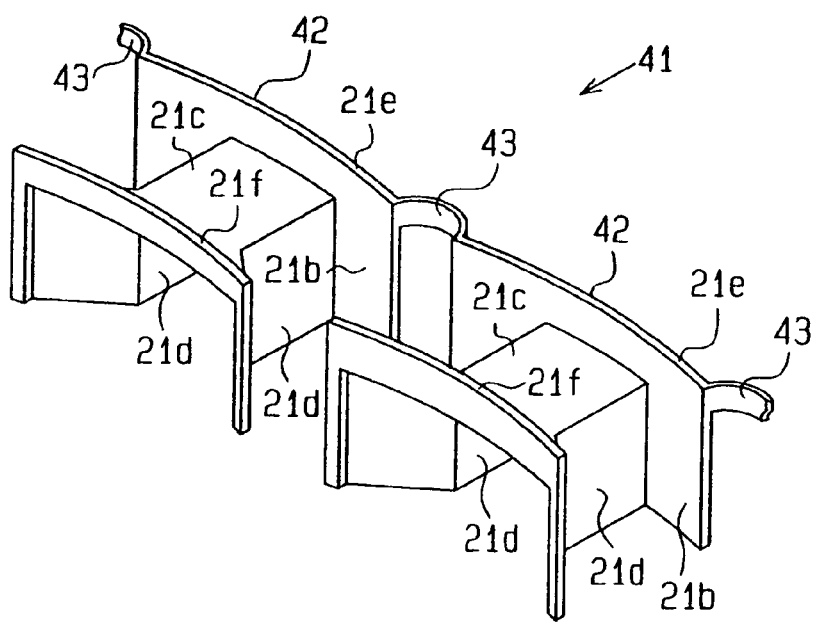
FIG. 33 is a perspective view illustrating an insulator according to a fourth embodiment of the present invention.
Figure 34:
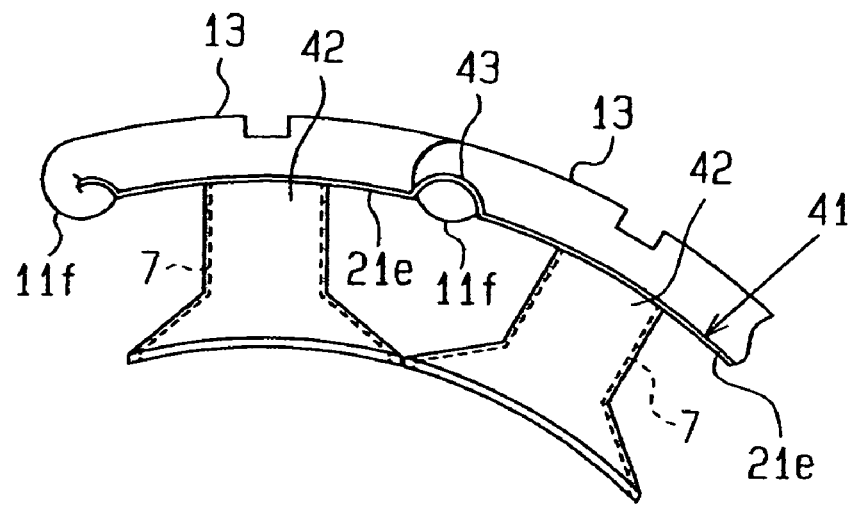
FIG. 34 is a plan view illustrating the insulator shown in FIG. 33 attached to the core segments.
Figure 35:
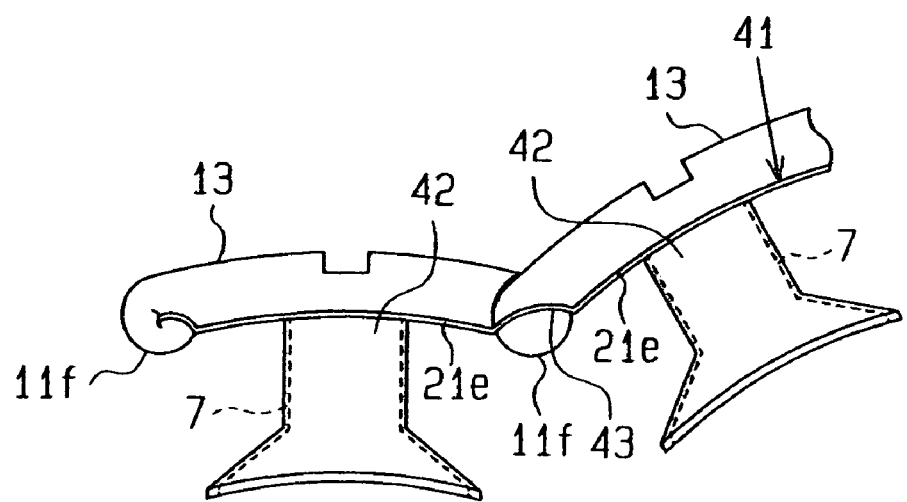
FIG. 35 is a plan view illustrating the insulator shown in FIG. 33 attached to the core segments.

A fourth embodiment of the present invention will now be described with reference to FIGS. 33 to 35.

In the first to third embodiments, the insulator 4 is formed by coupling separate insulating members. However, the insulator 41 of the fourth embodiment is an integrally molded part as shown in FIGS. 33 to 35. The insulator 41 includes insulating members 42, the number of which is twelve. Each insulating member 42 corresponds to one of the core segments 13. The insulator 41 also includes thin and flexible coupling portions 43, each of which couples the adjacent insulating members 42. The insulating member 42 does not have the arcuate cover 21*a* of the insulating member 21 shown in FIG. 5. Each coupling portion 43 couples the outer restricting walls 21*e* of the adjacent insulating members 42 with each other. The insulator 41 shown in FIG. 33 easily couples the adjacent core segments 13 to rotate relative to each other with the coupling portions 43 as shown in FIGS. 34 and 35. Furthermore, since the insulator 41 is an integrally molded part, which includes the insulating members 42 and the coupling portions 43, the insulator 41 has a simple shape and prevents the number of parts from increasing.

The embodiments of the present invention may be modified as follows.

In the first to third embodiments, the structure of each coupling portion between the adjacent insulating members may be modified as required. For example, in the first embodiment illustrated in FIGS. 1 to 12, the coupling bores 22*c* and the coupling projections 22*d* need not have an oval cross-section but may have a circular cross-section as in the second embodiment illustrated in FIGS. 13 to 16. In contrast, in the second embodiment illustrated in FIGS. 13 to 16, the coupling bores 33*g* and coupling projections 34*g* need not have a circular cross-section but may have an oval cross-section as in the first embodiment illustrated in FIGS. 1 to 12. Alternatively, in the first to third embodiments, the coupling bores need not be through holes as long as the coupling bores are recesses that can receive the coupling projections. That is, each coupling portion between the first insulating member and the second insulating member need only be formed by a coupling projection and a coupling opening that can receive the coupling projection.

The structure of the coupling portions according to the third embodiment illustrated in FIGS. 17 to 32 may be applied to the first embodiment of FIGS. 1 to 12. That is, in the first embodiment in which the insulator 4 is formed by the same insulating members 21, a circular coupling hole having a notch may be formed in one of the circumferential ends of each insulating member 21 and a circular coupling projection having a hook may be formed on the other one of the circumferential ends of the insulating member 21.

The hook 22e of each coupling projection 22d may be omitted. Instead of forming the axial bore 22f in each coupling projection 22d, the coupling projections 22d may be solid bodies.

The pair of holding portions 21g shown in FIG. 7 is formed by flexing the entire side covers 21d inward. Instead, for example, the side covers 21d may be flat and projections that function as holding portions may be formed on the inner surfaces of the side covers 21d. Alternatively, the holding portions 21g may be omitted. That is, the side covers 21d may simply be flat plates.

In the third embodiment illustrated in FIGS. 17 to 32, the coils 5 may be wound around the insulating members 33, 34 in a state as shown in FIG. 21 and the allowable angle may be set to the angle obtained when the insulating members 33, 34 are arranged as shown in FIG. 23. In this case, the orientation of at least either the notches 33h or the hooks 34h needs to be modified.

In the third embodiment illustrated in FIGS. 17 to 32, the push-out members 135 lift the second insulating members 34 to insert each coupling projection 34g into the corresponding coupling bore 33g. However, the inserting process for each coupling projection 34g into the corresponding coupling bore 33g is not limited to this. Instead, the first insulating members 33 may be moved, or both the first and second insulating members 33, 34 may be moved at the same time. That is, at least one of the first and second insulating members 33, 34 need to be moved in the axial direction.

In the third embodiment illustrated in FIGS. 17 to 32, the push-out members 135, each of which corresponds to and is located below one of the coupling projections 34g, move the first and second insulating members 33, 34 upward. However, the first and second insulating members 33, 34 may be moved upward with a mechanism different from the push-out members 135. The push-out members 135 may also be located at positions displaced from the coupling projections 34g. Furthermore, push-out members corresponding to the first insulating members 33 and push-out members corresponding to the second insulating members 34 may be provided separately.

In the illustrated embodiments, the arcuate projections 11f, 12f at the circumferential ends of the adjacent core segments 13 overlap one another in the axial direction. However, the circumferential ends of the adjacent core segments 13 need not overlap one another in the axial direction. The adjacent core segments 13 may be rotatably coupled to each other with, for example, a pin. Instead of forming each core segment by laminating piece members, each core segment may be formed as an integral part by sintering magnetic powder.

The number of the core segments 13 forming the stator core 6 need not be twelve. The number of the insulating members forming the insulator need not be twelve.

Therefore, the present examples and embodiments are to be considered as illustrative and not restrictive and the invention is not to be limited to the details given herein, but may be modified within the scope and equivalence of the appended claims.

We claim:

1. A method for manufacturing an insulator having first insulating members and second insulating members, which are arranged alternately, each first and second insulating members having circumferential ends, wherein each first insulating member includes through holes, which are formed on the circumferential ends of the first insulating member, and each second insulating member has coupling projections, which are formed on the circumferential ends of the second insulating member, the adjacent first and second insulating members being rotatably coupled when one of the coupling projections of the second insulating member is received by one of the through holes of the first insulating member, the through hole has a notch, which extends in the radial direction, each coupling projection has a hook at the distal end of the coupling projection, and the hook extends in the radial direction, and each adjacent pair of the first and second insulating members being located at a predetermined allowable angle relative to each another wherein each hook matches the corresponding notch as viewed in the axial direction so that each hook permits the corresponding coupling projection to be inserted into the corresponding through hole, the method comprising:

molding a plurality of first and second insulating members using a mold such that the first and second insulating members are axially displaced from each other and the predetermined allowable angle is defined by each adjacent pair of the first and second insulating members; and coupling the adjacent first and second insulating members by axially moving either the first or second insulating members relative to the other one of the first and second insulating members in the mold while the first and second insulating members are located at the allowable angle thereby inserting each coupling projection into the corresponding through hole.

2. The method according to claim 1, wherein either the first or second insulating members are axially moved while sliding along a contact surface formed in the mold.

3. A method for manufacturing an insulator attached to a core, wherein the core is divided into a plurality of core segments in the circumferential direction, and wherein the insulator insulates a coil wound around each of the core segments from the core, the method comprising:

molding a plurality of first and second insulating members each having circumferential ends, which are arranged alternately to form the insulator, wherein each insulating member corresponds to one of the core segments, wherein a coupling opening is formed on either circumferential end of each first insulating member, wherein a coupling projection is formed on either circumferential end of each second insulating member, and wherein the first and second insulating members are molded such that each coupling opening of each first insulating member is axially displaced from the corresponding one of the coupling projections of one of adjacent second insulating members; and coupling the adjacent first and second insulating members by axially moving either the first or second insulating members relative to the other one of the first and second insulating members in the mold thereby inserting each coupling projection into the corresponding coupling opening.

4. The method according to claim 3, wherein either the first or second insulating members are axially moved while sliding along a contact surface formed in the mold.

* * * * *